(12) United States Patent
Acreman et al.

(10) Patent No.: US 11,061,247 B2
(45) Date of Patent: Jul. 13, 2021

(54) LIQUID CRYSTAL PARALLAX BARRIER AND METHOD OF ADDRESSING

(71) Applicant: Sharp Kabushiki Kaisha, Osaka (JP)

(72) Inventors: Andrew Acreman, Oxford (GB); Nathan James Smith, Oxford (GB); Takehiro Murao, Osaka (JP); Ryoh Kikuchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 254 days.

(21) Appl. No.: 16/141,264

(22) Filed: Sep. 25, 2018

(65) Prior Publication Data

US 2020/0096796 A1 Mar. 26, 2020

(51) Int. Cl.
 *G02F 1/133* (2006.01)
 *G02B 30/31* (2020.01)
 (Continued)

(52) U.S. Cl.
 CPC ......... *G02B 30/31* (2020.01); *G02B 27/0093* (2013.01); *G02F 1/13471* (2013.01);
 (Continued)

(58) Field of Classification Search
 CPC ........ G02B 30/26; G02B 30/30; G02B 30/31; G02B 1/13756; G02B 1/134381; G02B 1/133742; G02B 2203/64
 See application file for complete search history.

(56) References Cited

U.S. PATENT DOCUMENTS 5,969,850 A 10/1999 Harrold et al.
7,813,042 B2 10/2010 Mather et al.
(Continued)

FOREIGN PATENT DOCUMENTS

WO 2014092172 6/2014
WO 2014136610 9/2014

OTHER PUBLICATIONS

D. Suzuki et al.: "A Wide View Glass-less 3D Display with Head-Tracking System for Horizontal and Vertical Directions", paper 73-2, pp. 990-993, SID 2016 DIGEST.

*Primary Examiner* — Paisley L Wilson
(74) *Attorney, Agent, or Firm* — Renner, Otto, Boisselle & Sklar, LLP

(57) ABSTRACT

A liquid crystal (LC) device includes an optical stack arrangement including from the viewing side: a first electrode component; a first LC alignment layer; an LC layer; a second LC alignment layer; and a second electrode component. A voltage is applied to the LC device to create a potential difference between the first and second electrode components to switch an alignment of liquid crystals of selected portions of the LC layer from a first state when no voltage is applied to a second state when the voltage is applied. The first and second LC alignment layers are vertical alignment layers that induce a vertical alignment of the liquid crystals such that the first state when no voltage is applied is a vertical alignment state, and the liquid LC crystals switch to a planar alignment state as the second state when the voltage is applied. The first and/or second electrode components is a dual layer segmented electrode component comprising a first layer of electrode elements separated by inter-electrode gaps and a second layer of electrode elements separated by inter-electrode gaps, the first layer of electrode elements and the second layer of electrode elements being spaced apart in a viewing direction by an insulator layer.

19 Claims, 12 Drawing Sheets

(51) Int. Cl.
  *G06F 3/01* (2006.01)
  *G02F 1/1347* (2006.01)
  *G02B 27/00* (2006.01)
  *G02F 1/1335* (2006.01)
  *G02F 1/137* (2006.01)
  *G02F 1/1337* (2006.01)
  *G02F 1/1343* (2006.01)

(52) U.S. Cl.
  CPC .......... *G02F 1/13476* (2013.01); *G06F 3/012* (2013.01); *G06F 3/013* (2013.01); *G02F 1/13756* (2021.01); *G02F 1/133528* (2013.01); *G02F 1/133742* (2021.01); *G02F 1/134381* (2021.01); *G02F 2203/64* (2013.01)

(56) References Cited

U.S. PATENT DOCUMENTS

| | | | |
|---|---|---|---|
| 7,868,952 B2 * | 1/2011 | Fukushima | ............ G02B 30/27 349/15 |
| 8,331,023 B2 | 12/2012 | Wu et al. | |
| 8,629,945 B2 | 1/2014 | Lo | |
| 2004/0263749 A1 * | 12/2004 | Jeong | ................ G02F 1/134363 349/141 |
| 2006/0146208 A1 | 7/2006 | Kim | |
| 2010/0110316 A1 | 5/2010 | Huang et al. | |
| 2011/0157171 A1 | 6/2011 | Lin | |
| 2011/0157497 A1 * | 6/2011 | Kim | ........................ G02B 30/27 349/15 |
| 2011/0170026 A1 | 7/2011 | Lin | |
| 2012/0154556 A1 * | 6/2012 | An | ........................ G02B 30/27 348/51 |
| 2012/0200680 A1 | 8/2012 | So et al. | |
| 2013/0050596 A1 | 2/2013 | Chen et al. | |
| 2013/0187961 A1 | 7/2013 | Hunt | |
| 2013/0342586 A1 | 12/2013 | Kim et al. | |
| 2014/0002758 A1 | 1/2014 | Huang et al. | |
| 2014/0078268 A1 | 3/2014 | Watanabe et al. | |
| 2016/0070111 A1 | 3/2016 | Takama et al. | |
| 2018/0199030 A1 | 7/2018 | Smith et al. | |

\* cited by examiner

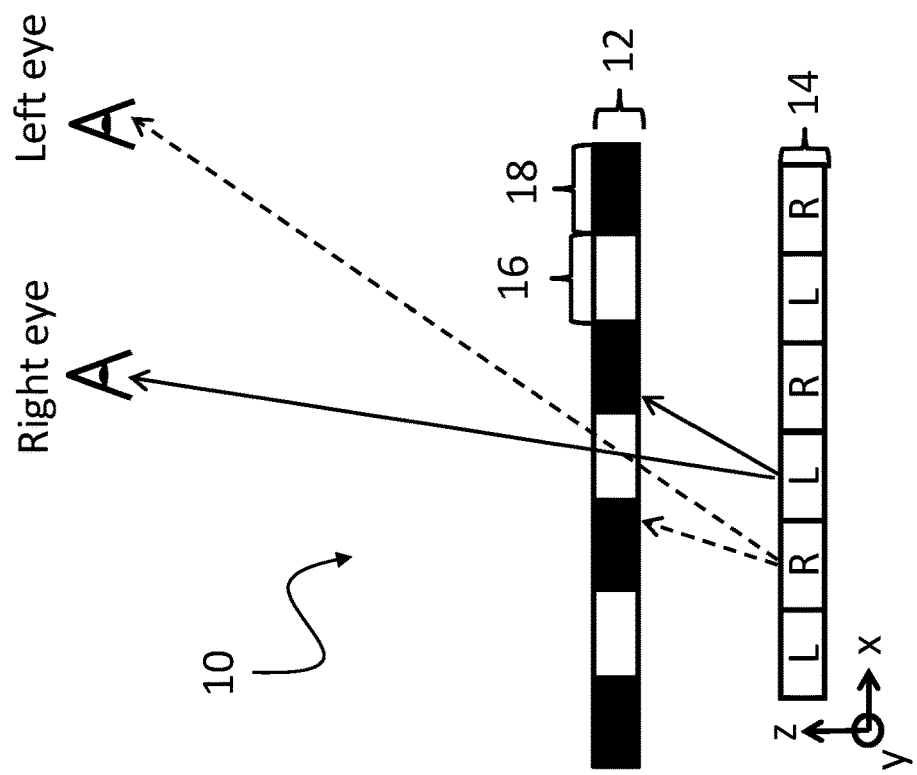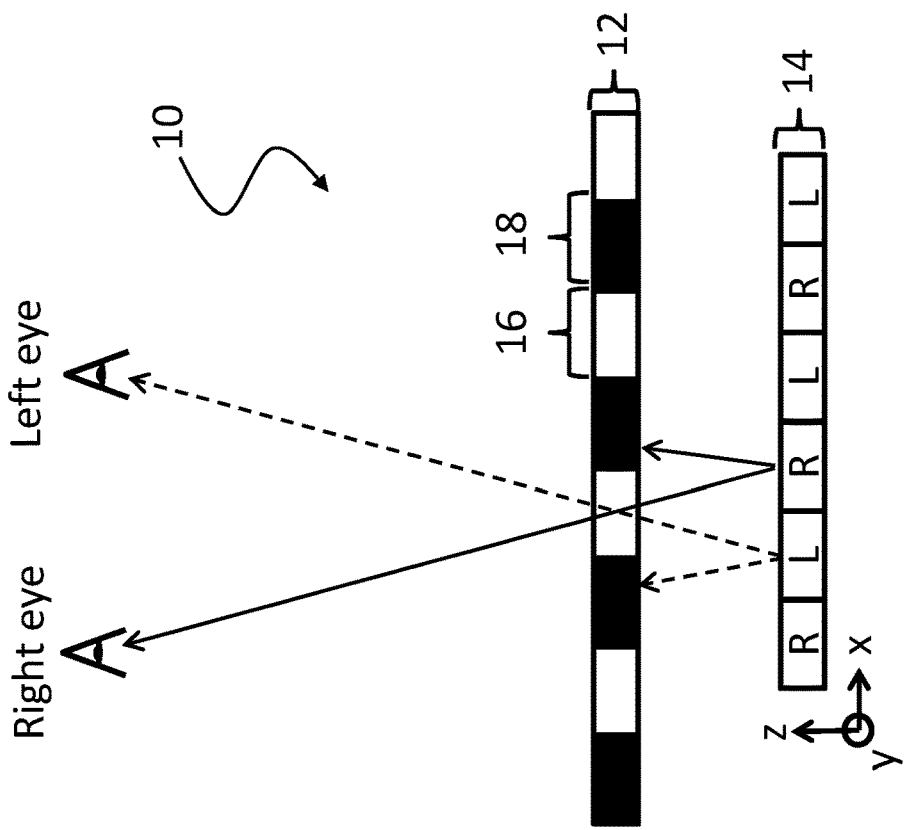

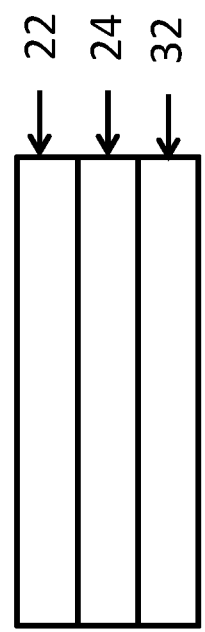
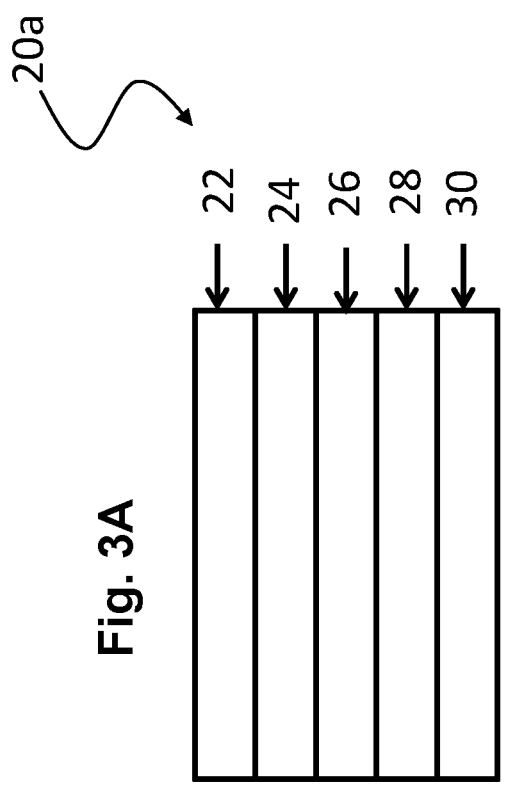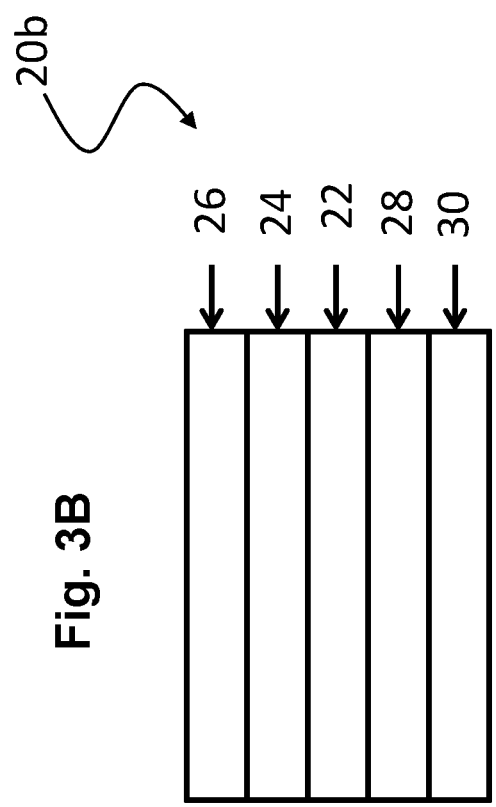

Fig. 12
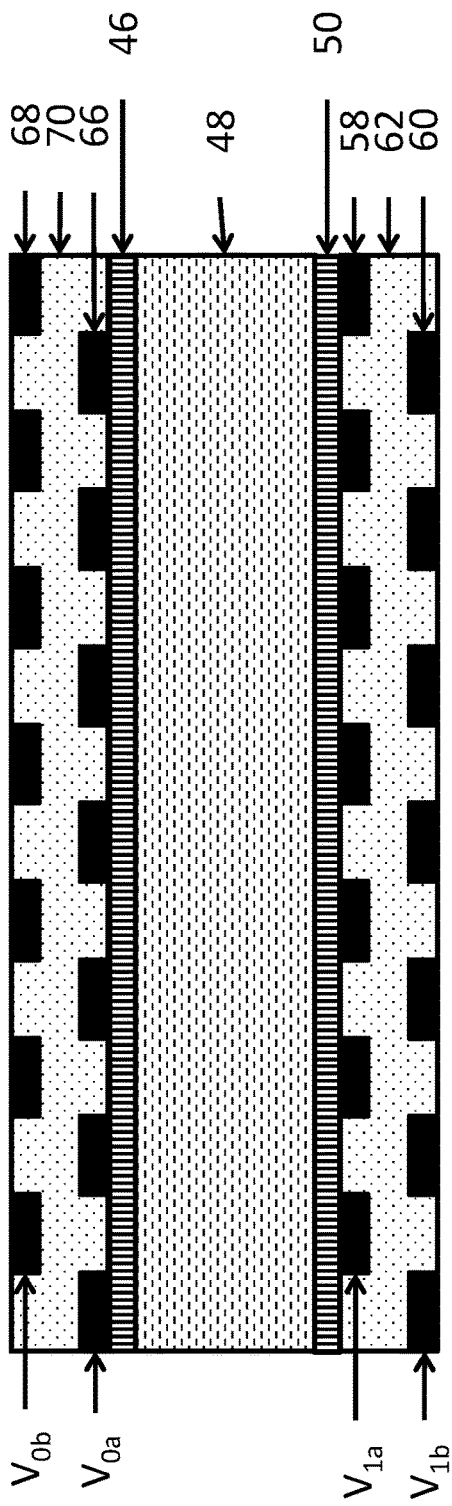
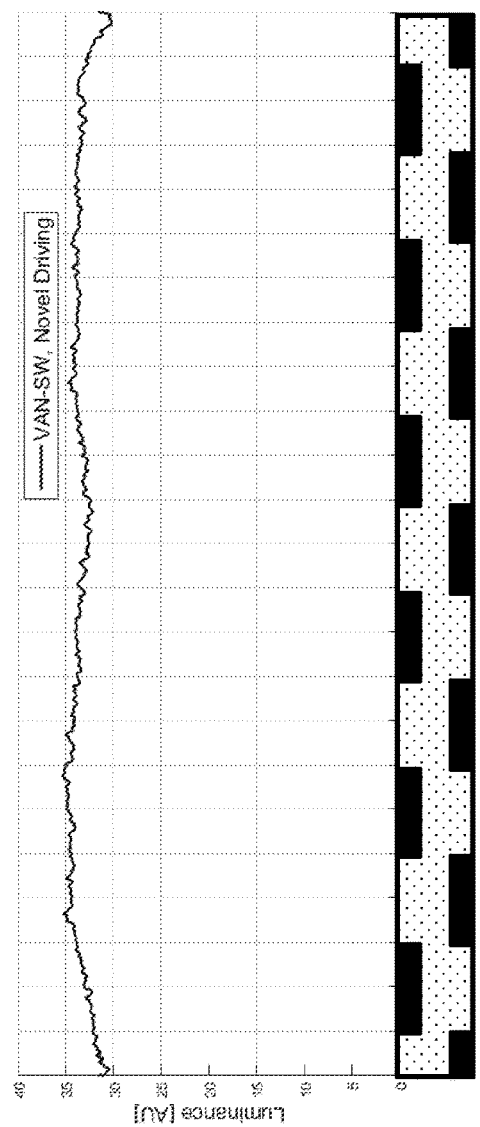

LIQUID CRYSTAL PARALLAX BARRIER AND METHOD OF ADDRESSING

TECHNICAL FIELD

The present invention relates to liquid crystal display devices, and more specifically to autostereoscopic three-dimensional (3D) display systems having a switchable liquid crystal parallax barrier and methods of addressing the parallax barrier elements.

BACKGROUND ART

Many attempts have been made to try to create better autostereoscopic three-dimensional (3D) displays. An autostereoscopic 3D display is a 3D display that gives stereoscopic depth without the viewer needing to wear special glasses. This is accomplished by projecting a different image to each eye. An autostereoscopic 3D display can be realized by using parallax optic technology, such as a parallax barrier or lenticular lenses, that can direct image light to either the left eye or the right eye Many applications exist whereby a 3D display is also required to operate in a high-quality two-dimensional (2D) mode as well as a high-quality 3D mode. For the image display to show an image with 100% native resolution in the 2D mode, the parallax barrier must be switchable between a first mode that provides substantially no imaging function (2D mode, i.e., passes the native image light without imposing a directional effect) to a second mode of operation that provides an imaging function (3D mode, i.e., passes the image light by imposing a directional effect to direct different image light to the left and right eyes). An example of a liquid crystal switchable parallax barrier technology is disclosed in U.S. Pat. No. 7,813,042 (Mather et al., issued Oct. 12, 2010).

The use of a parallax barrier is well known to direct a different image directly to each eye to create an autostereoscopic image for a static, non-moving viewer. However, in systems that presume the viewer is non-moving, the viewer must remain fixed in a limited space to view a high-quality 3D image. Movement of the viewer's head from side to side (i.e., lateral movement of the head relative to the display device) can cause the left eye image to be viewed with the right eye and vice versa. Viewing the left eye image with the right eye causes severe discomfort to the viewer.

To account for the issue of viewer movement, a liquid crystal parallax barrier having multiple independently addressable electrodes may be used in conjunction with a head tracking system so that for a given viewing position, the left eye image is always directed to the left eye and the right eye image is always directed to the right eye. The head tracking system determines the lateral position of the viewer's eyes and switches the appropriate electrodes on the liquid crystal parallax barrier between acting as opaque barrier elements versus transmissive slit elements to enable viewing of an autostereoscopic 3D image. Examples of such laterally tracking liquid crystal parallax barriers having multiple independently addressable electrodes and head tracking systems are disclosed in U.S. Pat. No. 5,969,850 (Harrold et al. issued Oct. 19, 1999), US 2010/0110316 (Huang et al., published May 6, 2010), US 2011/0157171-A1 (Lin, published Jun. 30, 2011) US 2013/0342586 (Kim et al., published, Dec. 26, 2013), US 2012/0200680 (So et al., published Aug. 8, 2012), WO 2014136610 (Murao et al., published Sep. 12, 2014), and US 2016/0070111 (Takama et al., published Mar. 10, 2016).

For some applications, particularly using relatively small display devices, a laterally tracked liquid crystal parallax barrier enables sufficient backwards and forwards (longitudinal movement) of the head so that the head can be at different distances relative to the display device to enabling high-quality 3D viewing. However, for other applications particularly using larger display devices, laterally tracking liquid crystal parallax barriers have the disadvantage that movement of the viewer's head backwards and forwards (longitudinal movement) to be at different distances relative to the display device causes the left eye image to be viewed with the right eye and vice versa, which again results in poor quality 3D viewing.

Accordingly, systems have been developed that further account for longitudinal tracking of distance from the display device, such as for example WO 2014092172 (Smith et al., published Jun. 19, 2014), U.S. Pat. No. 8,629,945 (Lo, issued Jan. 14, 2014), US 2013/0187961 (Hunt, published Jul. 25, 2013), US 2014/0078268A1 (Watanabe et al., published Mar. 20, 2014). Such systems include a liquid crystal parallax barrier having multiple electrodes that can enable both lateral and longitudinal head tracking while maintaining good quality 3D viewing. U.S. Pat. No. 8,331,023 (Wu et al., issued Dec. 11, 2011) and US 2013/0050596 (Chen et al., published Feb. 28, 2013) disclose the use of multiple stacked parallax barriers to enable tracking lateral and longitudinal head movement while maintaining good quality 3D viewing. US 2014/0002758 (Huang et al., published Jan. 2, 2014) discloses the use of a liquid crystal lens array that can switch between a first pitch and a second pitch for improving 3D viewing distance. An active matrix parallax barrier to enable tracking lateral and longitudinal head movement while maintaining good quality 3D viewing is described by D. Suzuki et al in the paper 73-2 "A Wide View Glass-less 3D Display with Head-Tracking System for Horizontal and Vertical Directions" page 990, SID 2016 DIGEST.

Despite such attempts to combine both lateral and longitudinal head tracking relative to the display device, conventional systems have varying effectiveness in accounting for head position. Accordingly, enabling a high-quality 3D mode in combination with enabling a high-quality 2D mode has not been fully achieved by conventional systems.

SUMMARY OF INVENTION

The present invention provides an autostereoscopic three-dimensional (3D) display system having an enhanced switchable and reconfigurable liquid crystal parallax barrier that permits both a high-quality 3D mode and a high-quality 2D mode. The present invention further provides related methods of addressing the parallax barrier elements to achieve such enhanced performance.

In exemplary embodiments, an autostereoscopic 3D display device includes a liquid crystal (LC) parallax barrier that is both a switchable parallax barrier and a reconfigurable parallax barrier. As used herein, the term "switchable" refers to the parallax barrier being switchable between at least two states, the first state being a state in which the parallax barrier has transmissive slit regions and opaque barrier regions (e.g., for a 3D or other directional viewing mode), while the second state is a fully transmissive state (e.g., for a 2D non-directional viewing mode). As also used herein, the term "reconfigurable" refers to the ability of the LC parallax barrier to achieve different positioning and/or size of the transmissive slit regions versus opaque barrier regions along the LC parallax barrier. A switchable and reconfigurable parallax barrier is combined with a head tracking system that enables the viewer to view good quality 3D over a large range of head positions in the lateral direction relative to the display device, and for a given range of longitudinal distances from the display device.

In exemplary embodiments, the 3D display device employs an LC parallax barrier having at least one dual layer segmented electrode component in which first and second layers of electrode elements are in different layers spaced apart from the liquid crystal layer at different distances. Also in exemplary embodiments, the LC parallax barrier has two such dual layer electrode components on opposing sides of the liquid crystal layer in the viewing direction, which permits the LC parallax barrier to generate two 3D viewing areas in the longitudinal direction at different distances from the display device where a viewer can observe a high-quality 3D image. An example of such an electrode structure is described in Applicant's commonly assigned US 2018/0199030 (Smith et al., published Jan. 10, 2018), which is incorporated here by reference.

The present invention provides further enhancement of the configurations described in US 2018/0199030 specifically for use in a head tracking 3D display device. In exemplary embodiments, an LC parallax barrier that is used as a parallax optic includes a specific switching geometry that incorporates a vertically aligned nematic switching mode (VAN mode) for the switchable parallax barrier, in contrast to a twisted nematic mode (TN) which is standard in the art and used, for example, in the device configurations described in US 2018/0199030. A VAN mode is advantageous for autostereoscopic 3D display devices, as the VAN mode enables the opaque barrier regions to have a darker and more consistent black state for a larger viewing angle range in comparison to a conventional TN mode. This gives the viewer a better 3D experience. Also in exemplary embodiments, within a dual layer segmented electrode structure, the first and second layers of electrodes are driven at different respective voltage magnitudes, which improves the optical quality of the 2D mode and of the transmissive slit regions in the 3D mode.

An aspect of the invention, therefore, is a liquid crystal (LC) device that has a layer configuration that optimizes a 3D viewing mode while also permitting a high quality 2D mode. In exemplary embodiments, the LC device includes an optical stack arrangement including from the viewing side: a first electrode component; a first LC alignment layer; an LC layer; a second LC alignment layer; and a second electrode component. A voltage is applied to the LC device to create a potential difference between the first and second electrode components to switch an alignment of liquid crystals of selected portions of the LC layer from a first state when no voltage is applied to a second state when the voltage is applied. The first and second LC alignment layers are vertical alignment layers that induce a vertical alignment of the liquid crystals such that the first state when no voltage is applied is a vertical alignment state, and the liquid LC crystals switch to a planar alignment state as the second state when the voltage is applied. At least one of the first and second electrode components is a dual layer segmented electrode component comprising a first layer of electrode elements separated by inter-electrode gaps and a second layer of electrode elements separated by inter-electrode gaps, the first layer of electrode elements and the second layer of electrode elements being spaced apart in a viewing direction by an insulator layer.

In exemplary embodiments, portions of the LC layer in the first state are opaque barrier regions that block light through the LC layer, and portions of the LC layer in the second state are transmissive slit regions that transmit light through the LC layer. The electrode elements of the at least one segmented electrode component are selectively addressable to switch selected portions of the LC layer from the first state to the second state. The first electrode component may be a common electrode component comprising a continuous electrode layer, with the second electrode component being the segmented electrode component. Alternatively, both the first and second electrode components are dual layer segmented electrode components.

The enhanced LC device may be incorporated into a display system with an image panel that emits light in the viewing direction corresponding to an image. The display system further may include a position sensor that tracks a head position of a viewer to generate position information, and a control system that is configured to receive the generated position information from the position sensor and based on the generated position information, controls the LC device to select portions of LC device to switch from the first state to the second state to form a barrier/slit pattern to generate a parallax barrier effect. The control system may include a look-up table that sets forth corresponding barrier/slit patterns and position information, and the control system controls the LC device to form a barrier/slit pattern retrieved from the look-up table that corresponds to the generated position information from the sensor.

Another aspect of the invention is a control method of controlling a liquid crystal (LC) device to generate a parallax barrier effect to generate the enhanced 3D mode while also permitting a high-quality 2D mode. In exemplary embodiments, the method includes the steps of: providing an LC device accordingly to any of the embodiments that is switchable and reconfigurable to generate a parallax barrier effect; and applying a voltage to a selected portion of the electrode elements of the at least one segmented electrode component to switch an alignment of liquid crystals of a portion of the LC layer corresponding to the selected portion of the electrode elements from the first state to the second state to form a pattern of opaque barrier regions that block light through the LC layer, and transmissive slit regions that transmit light through the LC layer, thereby generating the parallax barrier effect. In exemplary embodiments, voltages of different magnitudes may be applied to different layers of electrode elements within the dual layer segmented electrode component(s), and a voltage magnitude applied to elements of an electrode layer farther from the LC layer is greater than a voltage magnitude applied to elements of an electrode layer closer to the LC layer.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

FIG. 1 is a drawing illustrating the general operation of a parallax barrier type 3D display system.

FIG. 2 is a drawing illustrating the parallax barrier operation of FIG. 1 in connection with illustrating the problem of viewer movement.

FIGS. 3A, 3B, and 3C are schematic drawings depicting alternative exemplary layer configurations of a display system including a switchable and re-configurable liquid crystal (LC) parallax barrier.

FIG. 12 is a schematic diagram and related graph depicting luminance enhancement by applying driving voltages in accordance with embodiments of the present invention, for an LC parallax barrier having two dual layer segmented electrode components.

DESCRIPTION OF EMBODIMENTS

Figure 4:
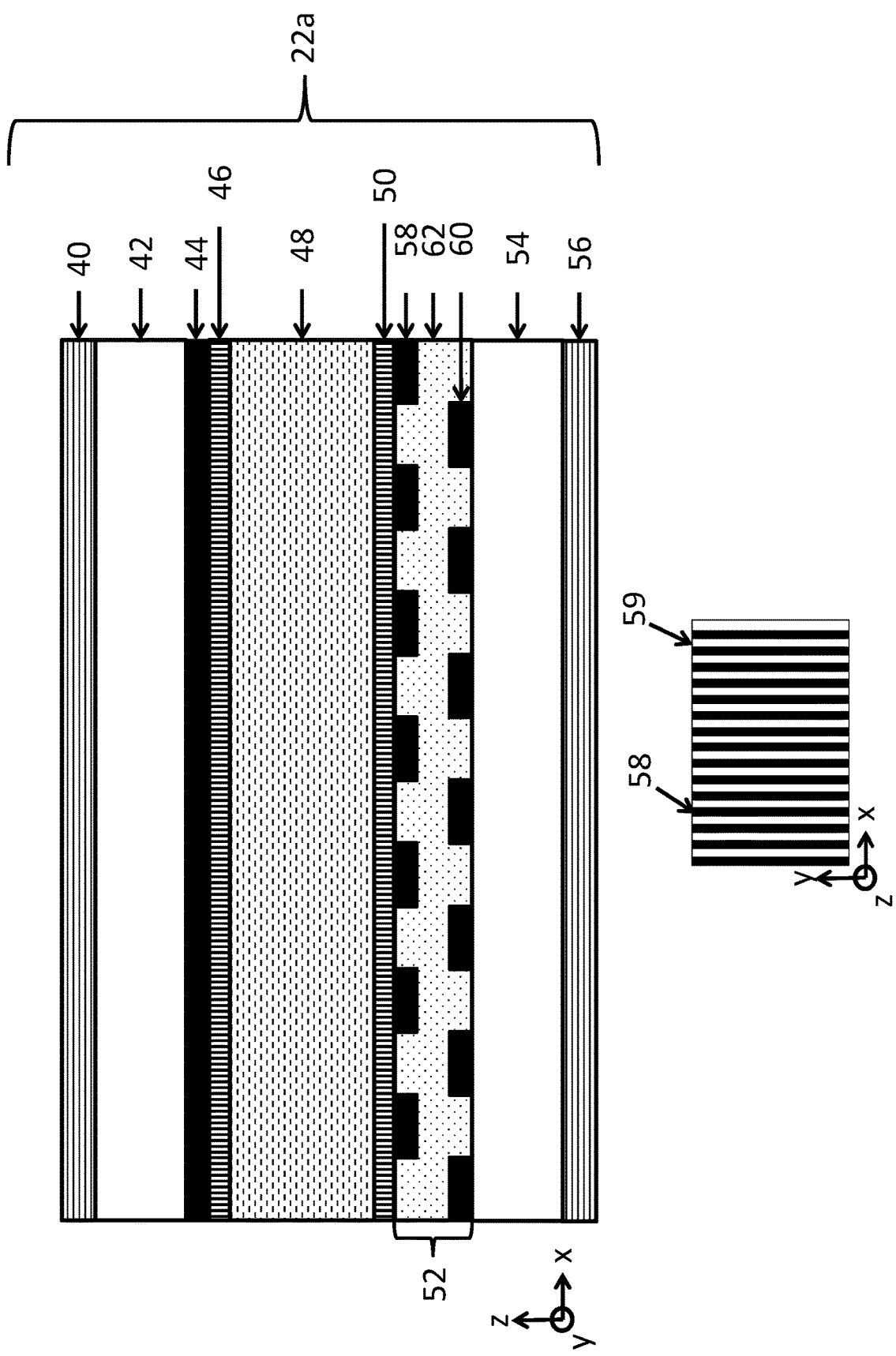
FIG. 4 is a schematic drawing depicting an optical layer stack arrangement of an exemplary LC parallax barrier in accordance with embodiments of the present invention.

Embodiments of the present invention will now be described with reference to the drawings, wherein like reference numerals are used to refer to like elements throughout. It will be understood that the figures are not necessarily to scale.

The present invention provides an autostereoscopic three-dimensional (3D) display device having an enhanced switchable and reconfigurable liquid crystal parallax barrier that permits both a high-quality 3D mode and a high-quality 2D mode. The present invention further provides related methods of addressing the parallax barrier elements to achieve such enhanced performance. The described devices and methods effectively account for viewer movement to provide an enhanced viewer experience as compared to conventional configurations. Viewer movement is accounted for using a reconfigurable liquid crystal (LC) parallax barrier, which is structured to optimize the ability to change the position and/or size of the transmissive slit regions versus opaque barrier regions of the LC parallax barrier, which is combined with head tracking to enhance the 3D effect.

FIG. 1 is a drawing illustrating the general operation of a parallax barrier type 3D display system 10. The display system 10 includes parallax barrier 12 and a display unit 14. A direction coordinate system also is shown, and in particular the "x" direction is referred to as the lateral direction along the display unit or parallax barrier, and the "z" direction is a longitudinal direction corresponding to a viewing distance from the display system.

To provide a 3D image, the display unit 14 generates image light from "L" pixels that correspond to a left-eye image, and from "R" pixels that correspond to a right-eye image. The parallax barrier is divided into transmissive slit regions 16 that transmit light, and opaque barrier regions 18 that block light. The slit and barrier regions operate to direct the left-eye image to the left eye, and the right-eye image to the right eye, when a viewer is at a typical viewing position. FIG. 1 thus illustrates the light rays that pass though the transmissive slit regions 16 of the parallax barrier, such that the light rays pass from an L pixel to the viewer's left eye and from an R pixel to the viewer's right eye. FIG. 1 further illustrates the light rays that are blocked by the opaque barrier regions 18 of the parallax barrier, such that light rays which would travel from an L pixel to the viewer's right eye, and from an R pixel to the viewer's left eye, are blocked. An important property for the parallax barrier is the absorbance of the barrier regions, and generally a greater absorbance gives a lower cross talk and better 3D quality.

FIG. 2 is a drawing illustrating the parallax barrier operation of FIG. 1 in connection with illustrating the problem of viewer movement. FIG. 2 illustrates operation of the 3D display system 10 when the viewer is offset from the center of the 3D display system. For example, the viewer may be observing the 3D display system from an angle, or when the viewer is located to the side of the 3D display system. FIG. 2 illustrates that with an offset viewer, the light rays that pass through the slit regions 16 of the parallax barrier pass from an L pixel to the viewer's right eye and from an R pixel to the viewer's left eye. FIG. 2 further illustrates that the barrier regions 18 block light rays which would travel from an L pixel to the viewer's left eye, and from an R pixel to the viewer's right eye. This is opposite to what is desired for effective 3D viewing.

The present invention operates to overcome such deficiency, whereby the appropriate image light is emitted to the corresponding eye even as the viewer moves relatively to the display system. An important property of the parallax barrier associated with such operation is the angular variation of the transmission and absorption respectively of the transmissive and opaque sections of the parallax barrier.

FIGS. 3A-3C are schematic drawings depicting alternative exemplary layer configurations of a display system including a switchable and re-configurable liquid crystal (LC) parallax barrier. In the example of FIG. 3A, a display system 20a includes, from a viewing side, an LC device 22 that operates as the switchable and re-configurable parallax barrier, a first gap layer 24, a transmissive type image panel 26 comprising an array of pixels that emit image light, a second gap layer 28, and a backlight unit 30 that illuminates the transmissive image display panel 26. The gap layers 24 and 28 each may be one or a combination of the following: a refractive index matching layer, a retarder film, air, and optical adhesive layer. FIG. 3B illustrates a display system 20b that is comparable to that of FIG. 3A, and further illustrating that the relative positioning of the LC parallax barrier 22 and the transmissive type image panel 26 may be interchanged, i.e., the transmissive type image panel 26 may be positioned on the viewing side relative to the LC parallax barrier 22. The example of FIG. 3C illustrates that an emissive type image panel 32 may be used, instead of a combination of a backlight unit with a transmissive type image panel. For example, the emissive type image panel 32 may be an organic light emitting diode (OLED) display, a quantum dot light-emitting diode (QLED) display, or a micro-LED display.

FIG. 4 is a schematic drawing depicting an optical layer stack arrangement of an exemplary switchable and reconfigurable LC parallax barrier 22a in accordance with embodiments of the present invention. In this example, the LC parallax barrier 22a has a single segmented electrode component comprising a dual layer electrode structure. More particularly, the dual layer electrode structure of the segmented electrode component includes two layers of interdigitated electrode elements. In the example depicted in FIG. 4, the LCD parallax barrier 22 includes from a viewing side: a front polarizer 40, a front substrate 42, a common electrode layer 44, a front LC alignment layer 46, an LC layer 48, a rear LC alignment layer 50, a segmented electrode component 52, a rear substrate 54, and a rear polarizer 56. The transmission axis of the front polarizer 42 is orthogonal to the transmission axis of the rear polarizer 56.

As referenced above, the segmented electrode component 52 has a dual layer electrode structure, which includes a first layer of electrode elements 58 closest to the LC layer 48, interdigitated with a second layer of electrode elements 60 farthest from the LC layer 48, which are contained within an insulating layer 62. The first layer of electrode elements 58 is thereby spaced apart from the second layer of electrodes 60 in the z direction (longitudinal direction or viewing distance), with first electrode layer 58 being a on viewing side of the optical stack relative to the second electrode layer 60. The electrode elements within each layer 58 and 60 are separated from each other by inter-electrode gaps. As illustrated in the small insert of FIG. 4, the segmented electrode component 52 is configured with the segmented electrode elements being continuous in the y direction relative to inter-electrode gaps 59, as illustrated by the insert showing a viewpoint in the (y, x) plane. Although the example of FIG. 4 illustrates two layers of interdigitated electrodes, comparable operation in principle could be expanded to segmented electrode structures having additional layers of electrode elements. As described in more detail below, each electrode element is independent addressable to generate opaque versus transmissive regions in connection with generating a parallax barrier effect.

In the example illustrated in FIG. 4, each electrode element of the first electrode layer 58, each electrode element of the second electrode layer 60, and the inter-electrode gaps between adjacent electrode elements within each electrode layer, all have identical sizes. Generally, for optimal performance the electrode elements of the first electrode layer 58 on the viewing side (closer to the LC layer) of the optical stack and the inter-electrode gaps should be a similar size, but the electrode elements of the non-viewing side (farther from the LC layer) second electrode layer may be larger. Furthermore, while the inter-electrode gaps and electrode elements of the first electrode layer 58 should be similar sizes, they may be slightly different in width. This is because when the inter-electrode gaps and electrode elements are the same size, fringe field effects at the edge of the first electrode layer can lead to the width of a dark region to change depending on whether the edges are viewing side or non-viewing side electrode elements.

In exemplary embodiments, one or both of the front and rear polarizers may be omitted due to redundancy, which would depend on the position of the image panel and whether a polarized backlight is used. Furthermore, one or more "in cell" polarizers could be used in lieu of the external polarizer layers. For enhanced performance, the polarizers should be crossed and with the transmission axis of one of the polarizers being parallel to the axis of the electrode layers. In addition, either or both of the polarizers may include compensation layers, such as a negative C plate film. In addition, the positioning of the segmented electrode components and the common electrode layer may be interchanged, with the segmented electrode component being located on the viewing side relative to the common electrode.

Figure 5:
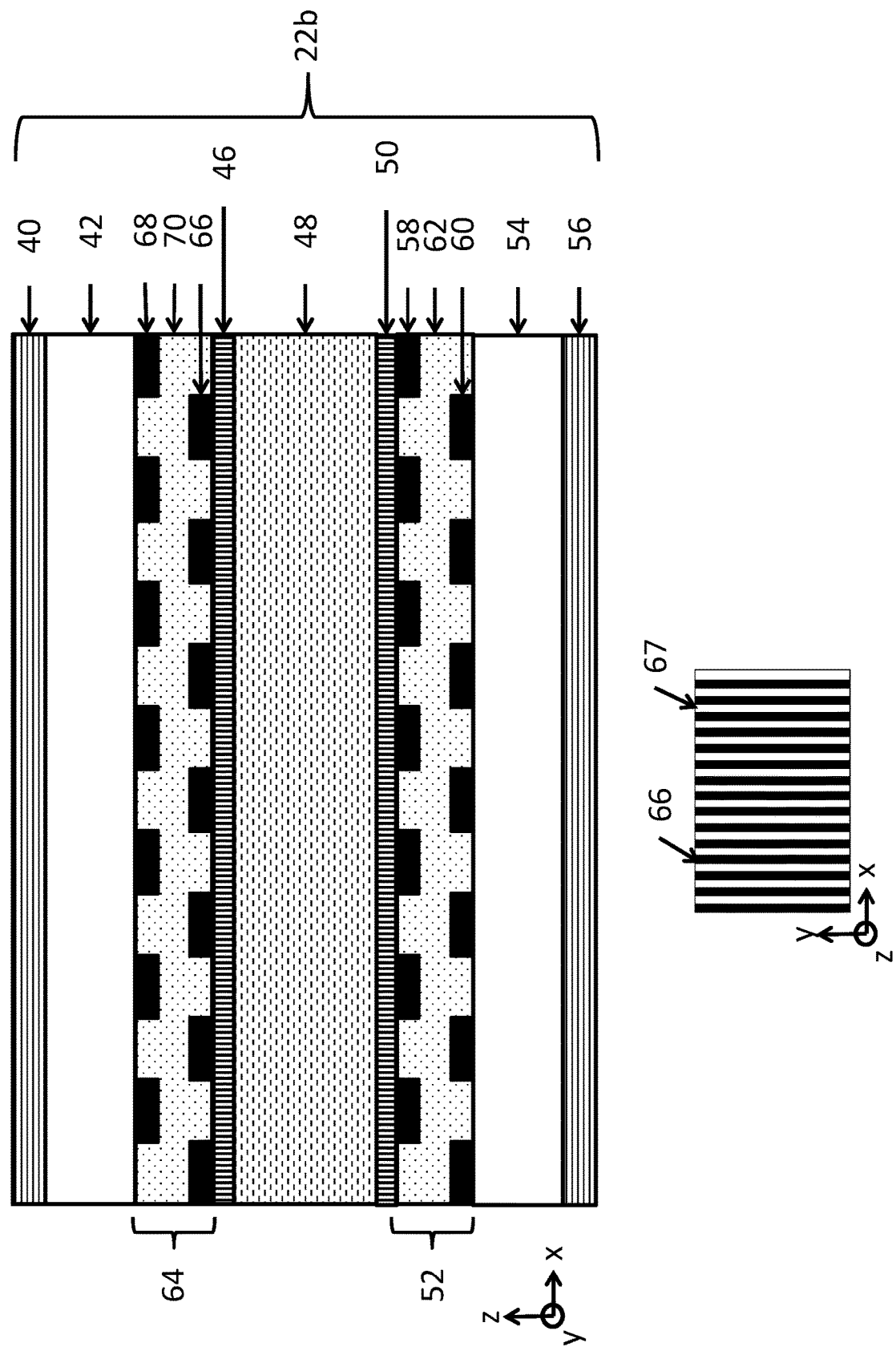
FIG. 5 is a schematic drawing depicting another optical layer stack arrangement of an exemplary LC parallax barrier in accordance with embodiments of the present invention.

FIG. 5 is a schematic drawing depicting another optical layer stack arrangement of an exemplary LC parallax barrier 22b in accordance with embodiment of the present invention. The LC parallax barrier 22b has overlapping components with LCD parallax barrier 22a of FIG. 4, and thus like components are identified with like reference numerals in FIGS. 4 and 5. The principle difference is that in the optical stack of FIG. 5, the common electrode layer is replaced with a second (viewing side) segmented electrode component 64.

The second segmented electrode component 64 is structured comparably in many respects as the first (non-viewing side) segment electrode component 52. Accordingly, the second segmented electrode component 64 also has a dual layer electrode structure, which includes a first layer of electrode elements 66 interdigitated with a second layer of electrode elements 68, which are contained within an insulating layer 70. The first layer of electrode elements 66 is thereby spaced apart from the second layer of electrodes 68 in the z direction, with first electrode layer 66 being a on non-viewing side (closest to the LC layer 48) of the optical stack relative to the viewing side second electrode layer 68 (farthest from the LC layer). The electrode elements within each layer 66 and 68 also are separated from each other by inter-electrode gaps. Similarly as with the first segmented electrode component, as illustrated in the small insert of FIG. 5, the second segmented electrode component 64 is configured with the segmented electrode elements being continuous in the y direction relative to the inter-electrode gaps 67 as illustrated by the insert showing a viewpoint in the (y, x) plane. Although the example of FIG. 5 illustrates two layers of interdigitated electrodes, comparable operation in principle could be expanded to segmented electrode structures having additional layers of electrode elements. Each electrode element also is independent addressable to generate opaque versus transmissive regions.

Similarly in the example illustrated in FIG. 5 as with FIG. 4, with respect to the second electrode component 64, each electrode element of the first electrode layer 66 (closer to the LC layer), each electrode element of the second electrode layer 68 (farther form the LC layer), and the inter-electrode gaps between adjacent electrode elements within each electrode layer, all have identical sizes. Generally, for optimal performance the electrode elements of the first electrode layer 66 on the non-viewing side (closer to the LC layer) of the optical stack and the inter-electrode gaps should be a similar size, but the electrode elements of the viewing side (farther from the LC layer) second electrode layer 68 may be larger. Furthermore, while the inter-electrode gaps and electrode elements of the first electrode layer 66 should be similar sizes, they also may be slightly different in width to reduce fringe field effects. In addition, comparing the first segmented electrode component 52 to the second segmented electrode component 64, the two segmented electrode components may have different pitches, with the pitch being defined as electrode width plus the inter-electrode gap. The different pitches enable two viewing regions in the z direction with distance from the display device, which is described for example in US 2018/0199030 referenced above.

In general, the present invention provides further enhancement of previous configurations, such as for example configurations described in US 2018/0199030, specifically for use in a head tracking 3D display device. In exemplary embodiments, the LC parallax barrier 22a/22b includes a specific switching geometry that incorporates a vertically aligned nematic switching mode (VAN mode) for the switchable and reconfigurable LC parallax barrier, in contrast to a twisted nematic mode (TN) which is standard in the art and used, for example, in the devices of US 2018/0199030. A VAN mode is advantageous for autostereoscopic 3D display devices as the VAN mode enables the opaque barrier regions to have a darker and more consistent black state for a larger angle range in comparison to a TN mode. This gives the viewer a better 3D experience. Also in exemplary embodiments, within a dual layer segmented electrode component as described above, the first and second layers of electrode elements within each dual layer electrode component may be driven at different respective voltage magnitudes, which improves the optical quality of the 2D mode and of the transmissive slit regions in the 3D mode.

An aspect of the invention, therefore, is a liquid crystal (LC) device that has a layer configuration that optimizes a 3D viewing mode while also permitting a high quality 2D mode. In exemplary embodiments, the LC device includes an optical stack arrangement including from the viewing side: a first electrode component; a first LC alignment layer; an LC layer; a second LC alignment layer; and a second electrode component. A voltage is applied to the LC device to create a potential difference between the first and second electrode components to switch an alignment of liquid crystals of selected portions of the LC layer from a first state when no voltage is applied to a second state when the voltage is applied. The first and second LC alignment layers are vertical alignment layers that induce a vertical alignment of the liquid crystals such that the first state when no voltage is applied is a vertical alignment state, and the liquid LC crystals switch to a planar alignment state as the second state when the voltage is applied. At least one of the first and second electrode components is a dual layer segmented electrode component comprising a first layer of electrode elements separated by inter-electrode gaps and a second layer of electrode elements separated by inter-electrode gaps, the first layer of electrode elements and the second layer of electrode elements being spaced apart in a viewing direction by an insulator layer.

Figure 6:
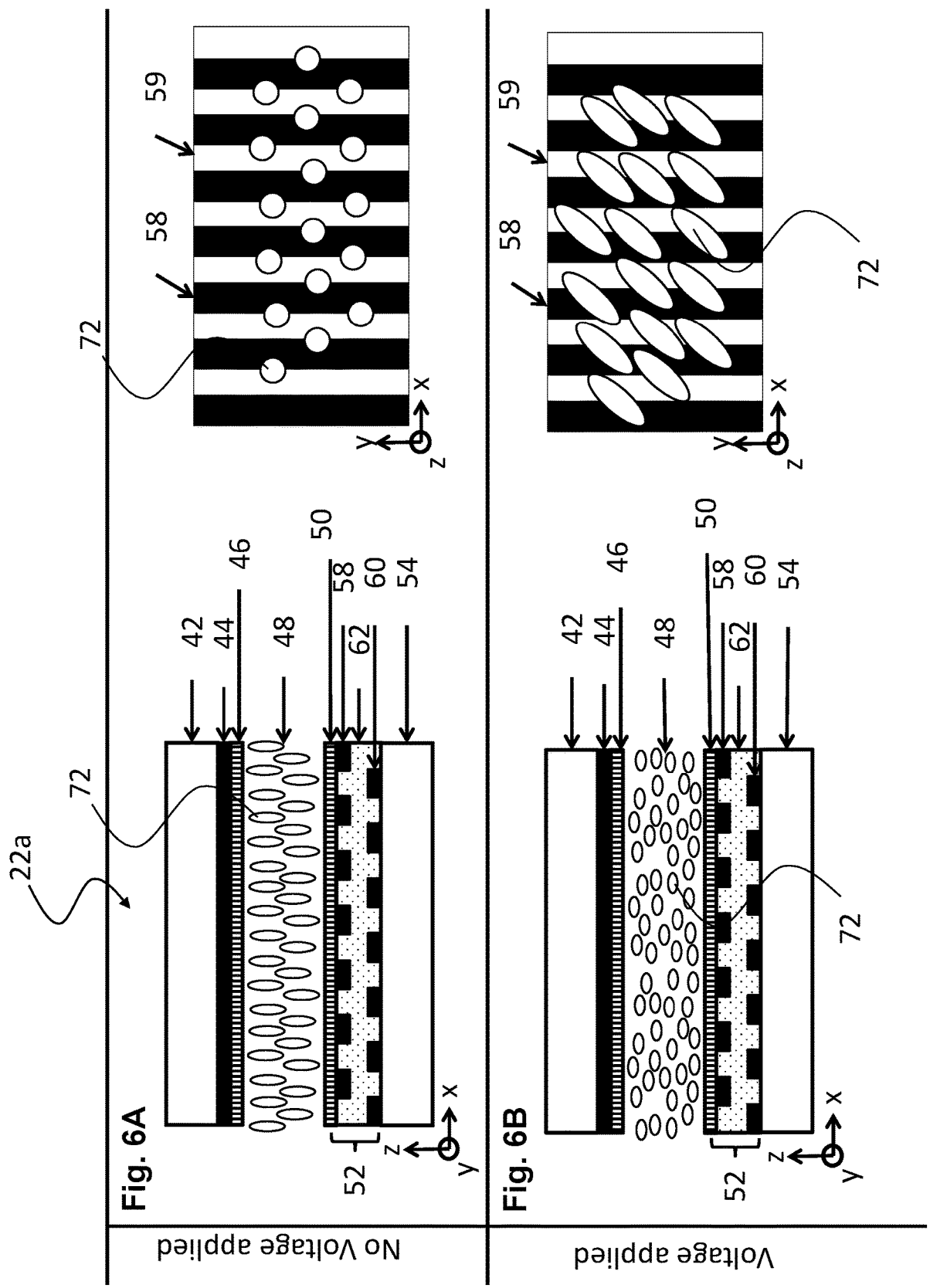
FIGS. 6A and 6B are schematic drawings depicting vertically aligned nematic (VAN) switching that is employed in accordance with embodiments of the present invention.

In accordance with the above, FIGS. 6A and 6B are schematic drawings illustrating the vertically aligned nematic (VAN) switching that is employed in accordance with embodiments of the present invention. FIGS. 6A and 6B illustrate the VAN switching in connection with the exemplary optical stack arrangement of FIG. 4 having a single dual layer segmented electrode component, although comparable principles are applicable to the exemplary optical stack arrangement of FIG. 5 having two dual layer segmented electrode components. In particular, FIG. 6A illustrates a first state of the LC parallax barrier 22a when no voltage is applied, and FIG. 7B illustrates a second state of the LC parallax barrier 22a when a voltage is applied. Each of FIGS. 6A and 6B illustrate the respective LC states from two viewpoints, in the (z, x) plane and the (y, x) plane. The polarizer elements are omitted from these figures for simplicity.

As depicted in the first state of FIG. 6A, when no voltage is applied between the common and segmented electrode components 44 and 52, liquid crystals 72 within the LC layer 48 align vertically in the z (viewing) direction at the alignment layer interfaces as is dictated by the first and second alignment layers 46 and 50.

In other words, both the first and second alignment layers 46 and 50 are configured with a groove or other comparable structure to induce said vertical alignment, which specifically is induced in the absence of the applied voltage. The alignment layers may be photo alignment type or rubbed type alignment layers that are formed in a manner to induce the vertical alignment directions. The alignment needs to have a slight pretilt (~0.1-2°) to define an axis along which the liquid crystals 72 will re-orientate when a voltage is applied, as is known in the art. This pretilt should be in a direction not parallel to the absorption direction of either the front or rear polarizers 40 and 56, and preferably 45° to both polarizers. The first or VAN state corresponds to an opaque state, in which the polarization of light is rotated by the LC layer 48 and is subsequently absorbed by the polarizer 40.

FIG. 6B illustrates the second state of LC parallax barrier 22a when a driving voltage is applied to either the common electrode 44 and/or to the dual layer segmented electrode component 52 to generate a potential difference between the electrode components. When a voltage is applied resulting in a potential difference having a magnitude above a switching threshold of the LC layer, the liquid crystals 72 re-orientate under the electrical forces into the plane of the substrates 42/54. To aid re-orientation in such direction, the liquid crystal material of the LC layer 48 may be selected to be a negative dielectric anisotropy type liquid crystal. The plane in which the liquid crystal re-orientates is defined by the pretilt angle at the alignment layers 46 and 50 referenced above. The second or planar state corresponds to a transmissive state in which light passes through the LC layer 48. When the voltage is removed, the liquid crystals 72 will revert back to the default VAN state that is induced by the alignment layers 46 and 50. The re-orientation direction should be not parallel or perpendicular to the transmission axis of the front polarizer, and preferably should be at 45° to the transmission axis of the front top polarizer.

The use of one or two segmented electrode components 52 and/or 64 permits the generation of a parallax barrier effect by selective application of a voltage to different groups of individual electrode elements within the segmented electrode components. A suitable addressing device or control system may be employed to apply voltages to the individual electrode elements in such a selective manner. As to groups of electrode elements to which no voltage is applied, such groups remain in the first or VAN state, thereby forming opaque barrier regions where the polarization of light is rotated by the LC layer 48 and is subsequently absorbed by the polarizer 40. Conversely, as to groups of electrode elements to which a voltage is applied, such groups re-orient to the second or planar state, thereby forming transmissive slit regions where light is transmitted through the LC layer 48. By selectively forming such opaque and transmissive regions, alternating opaque barrier regions and transmissive slit regions are formed that can generate a parallax barrier effect for a 3D display mode.

Another aspect of the invention, therefore, is a control method of controlling a liquid crystal (LC) device to generate a parallax barrier effect to generate the enhanced 3D mode while also permitting a high-quality 2D mode. In exemplary embodiments, the method includes the steps of: providing an LC device accordingly to any of the embodiments that is switchable and reconfigurable to generate a parallax barrier effect; and applying a voltage to a selected portion of the electrode elements of the at least one segmented electrode component to switch an alignment of liquid crystals of a portion of the LC layer corresponding to the selected portion of the electrode elements from the first state to the second state to form a pattern of opaque barrier regions that block light through the LC layer, and transmissive slit regions that transmit light through the LC layer, thereby generating the parallax barrier effect.

Figure 7:
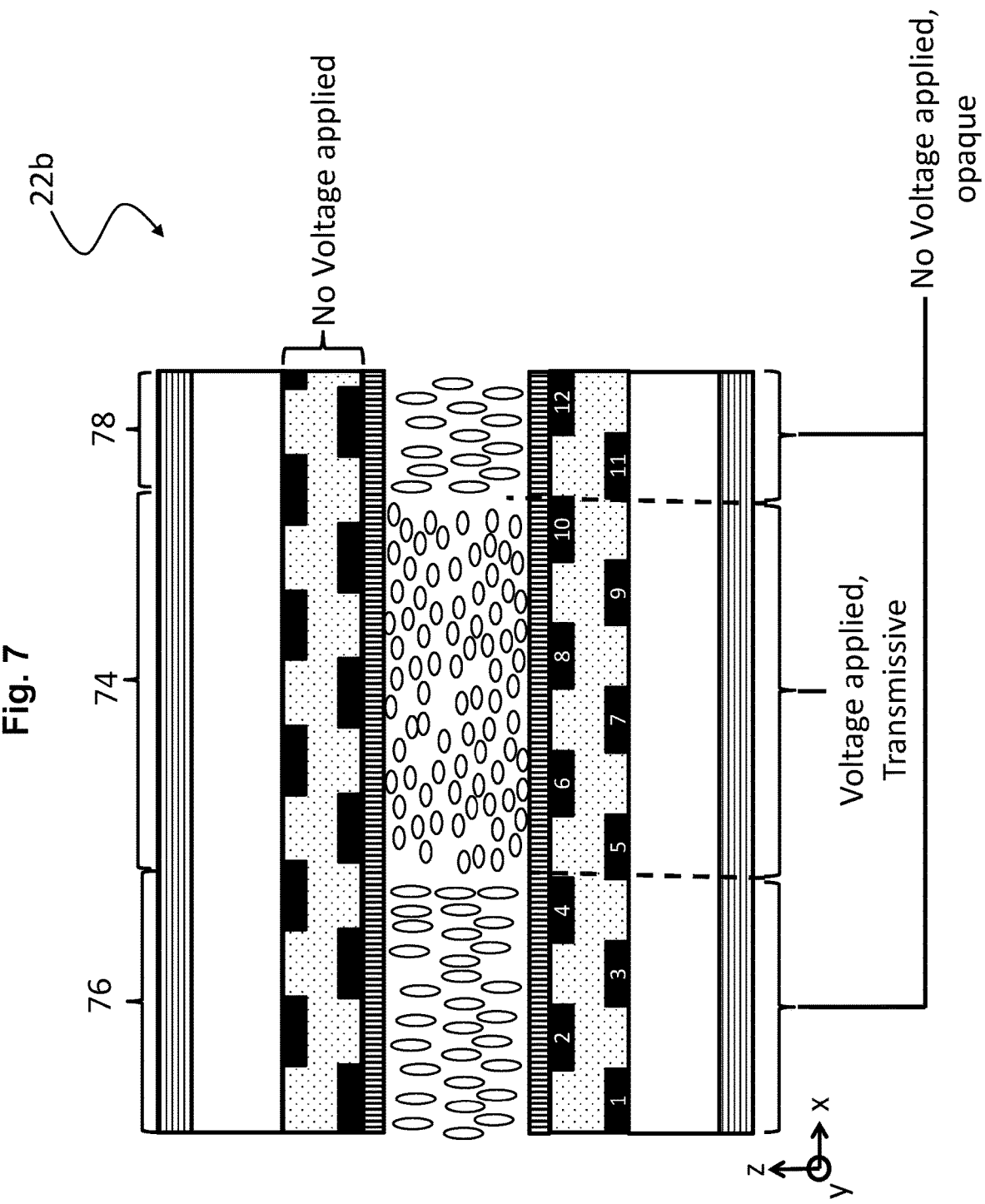
FIG. 7 is a schematic drawing depicting selective driving of electrode elements to generate a parallax barrier effect in accordance with embodiments of the present invention.

FIG. 7 is a schematic drawing depicting selective driving of electrode elements to generate a parallax barrier effect in accordance with embodiments of the present invention. FIG. 7 illustrates generating a parallax barrier effect in connection with the exemplary optical stack arrangement of FIG. 5 having two dual layer segmented electrode components, although comparable principles are applicable to the exemplary optical stack arrangement of FIG. 4 having a single dual layer segmented electrode component.

In the example of FIG. 7, a parallax barrier effect is generated by applying a voltage to one or more subsections or groups of electrode elements within at least one of the dual layer segmented electrode components, while the other subsections or groups of electrode elements have no voltage applied. In this specific example, the voltage is applied to a portion of the first (non-viewing side) segmented electrode component, with the individual electrode elements being numbered 1-12 for illustration. As shown, electrode elements 5-10 have a voltage applied to them, and consequently act as a transmissive slit region 74. In addition, electrode elements 1-4 and 11-12 have no voltage applied to them, and consequently act as opaque barrier regions 76 and 78. In combination, the selective application of the voltage to different groups or portions of electrode elements is performed to generate a suitable pattern of alternating slits and barriers, thereby generating a parallax barrier effect. In addition, by selectively applying voltages to different groups of electrode elements, the locations and/or sizes of the slits and barriers in the lateral x-direction along the LC parallax barrier can be changed. Such changes can be performed in response to a head tracking output to reconfigure the LC parallax barrier in accordance with the tracked head position for optimal 3D viewing. Furthermore, when two dual layer segmented electrode components are used, the viewer position in the z-direction corresponding to a viewing distance from the display system may be accounted for as described in US 2018/0199030. A high-quality 2D mode also is provided by rendering the entire LC parallax barrier transmissive.

Figure 8:
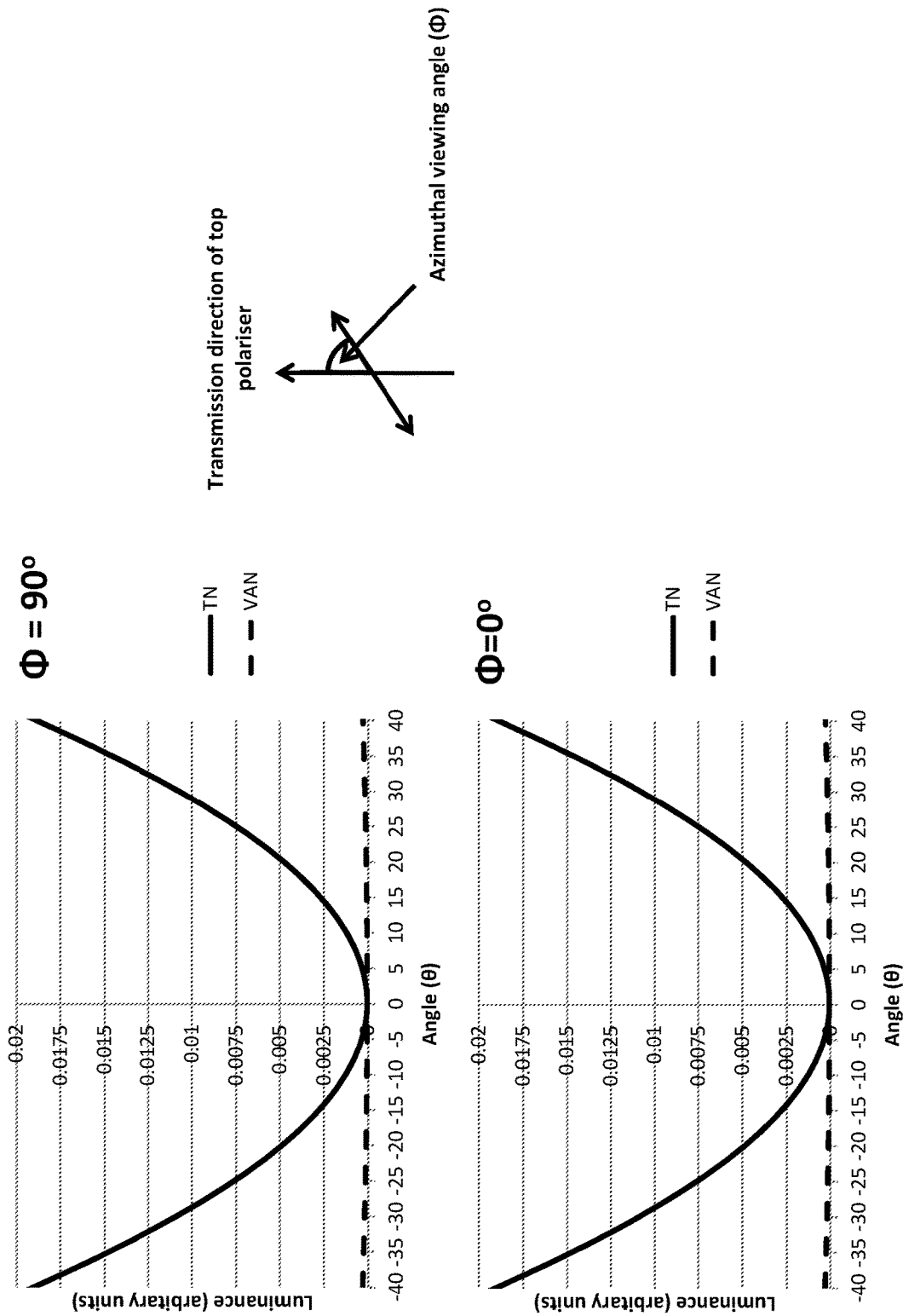
FIG. 8 includes graphs comparing the luminance profile for barrier region performance of VAN switching of the present invention versus conventional twisted nematic (TN) switching.

As referenced above, a VAN state barrier region is advantageous for autostereoscopic 3D display devices because the VAN state enables the barrier regions to have a darker and more consistent black state for a larger angle range in comparison to a TN mode as used in conventional configurations, which enhances the 3D viewing experience. FIG. 8 includes graphs comparing the luminance profile for barrier performance of VAN switching of the present invention versus conventional TN switching. The graphs depict luminance of the barrier regions as a function of zenith viewing angle of a viewer between ±40° relative to viewing center, for azimuthal viewing angles ($\varphi$) of 0° and 90° (parameters known in the art as defined with respect to the transmission direction of the front polarizer as shown in the figure).

As shown in FIG. 8, the VAN state has near zero luminance across typical viewing angles, whereas the TN state luminance rapidly increases as viewing angle moves off center. For the preferred azimuthal viewing angles $\varphi$ of 0° and 90°, therefore, the VAN state provides a substantially superior black state as compared to conventional TN modes across the range of suitable viewing angles. The enhanced black state of the VAN mode may stem from the VAN state being default opaque, whereas the TN state is default transmissive. The default state tends to be more true than the switched state, as the switching voltage may re-orient the liquid crystals to an extent less than the ideal of complete re-orientation. Consequently, the 3D display using the VAN state in accordance with embodiments of the present invention will have lower cross talk (caused in part by transmission though the opaque sections of the LC parallax barrier) and therefore better 3D quality as compared to conventional configurations. This is particularly beneficial when the viewer is in a position offset from the center viewing line of the 3D display system. Relatedly, the preferred optical axes are at azimuthal viewing angles $\varphi$ of 0° and 90° to the transmission axis of the front polarizer. Consequently, the front polarizer should be orientated vertically or horizontal with respect to the plane between the viewer and the display system.

Figure 9:
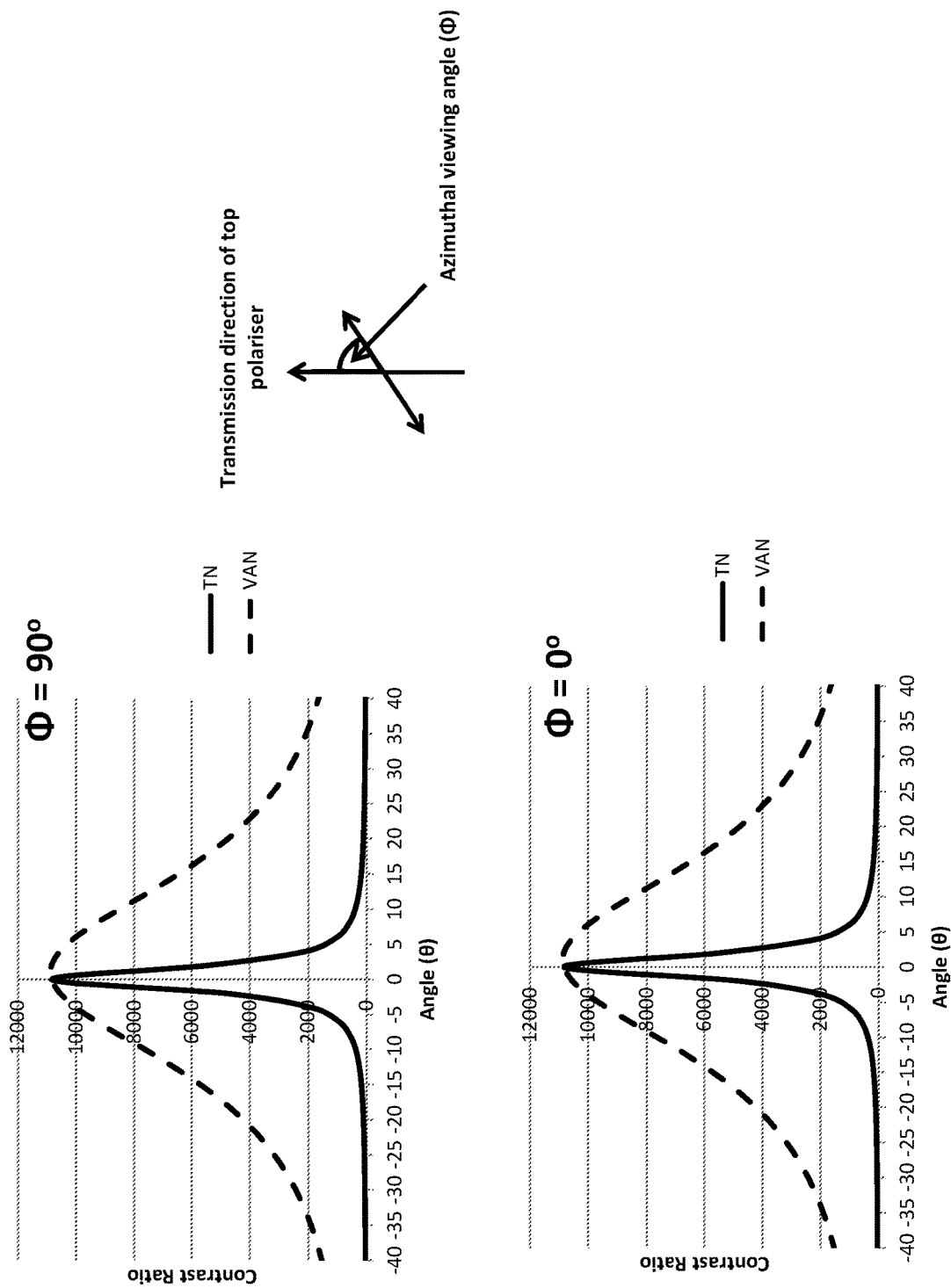
FIG. 9 includes graphs comparing the contrast ratio of VAN switching of the present invention versus conventional TN switching.

FIG. 9 includes graphs comparing the contrast ratio of VAN switching of the present invention versus conventional TN switching. The graphs depict contrast ratio as a function of viewing angle of a viewer between ±40° relative to viewing center, again for azimuthal viewing angles $\varphi$ of 0° and 90. As shown in FIG. 9, using the VAN state results in substantially greater contrast ratio across typical viewing angles as compared to using the TN state for the preferred azimuthal viewing angles $\varphi$ of 0° and 90°. This further illustrates that the 3D display using the VAN state in accordance with embodiments of the present invention will achieve better 3D quality as compared to conventional configurations, as evidenced by the enhanced contrast ratio across typical viewing angles.

As referenced above, for an LC layer a default state when a voltage is not applied tends to be more true than the switched state, as the switching voltage may re-orient the liquid crystals to an extent less than the ideal of complete re-orientation. This is why the VAN switching described herein results in an enhanced black state, but this same performance factor can present issues for portions of the LC parallax barrier that are switched into transmissive state. This issue particularly arises for the dual layer segmented electrode component, whereby electrode elements farther from the LC layer are less effective at re-orienting the LC crystals to the transmissive state as compared to electrode elements closer to the LC layer for a given input driving voltage magnitude. The result is, for a given input driving voltage, a non-uniformity of luminance for regions of the LC parallax barrier switched to the transparent state, with luminance being particularly reduced in correspondence with individual electrode elements that are located farther from the LC layer.

Figure 10:
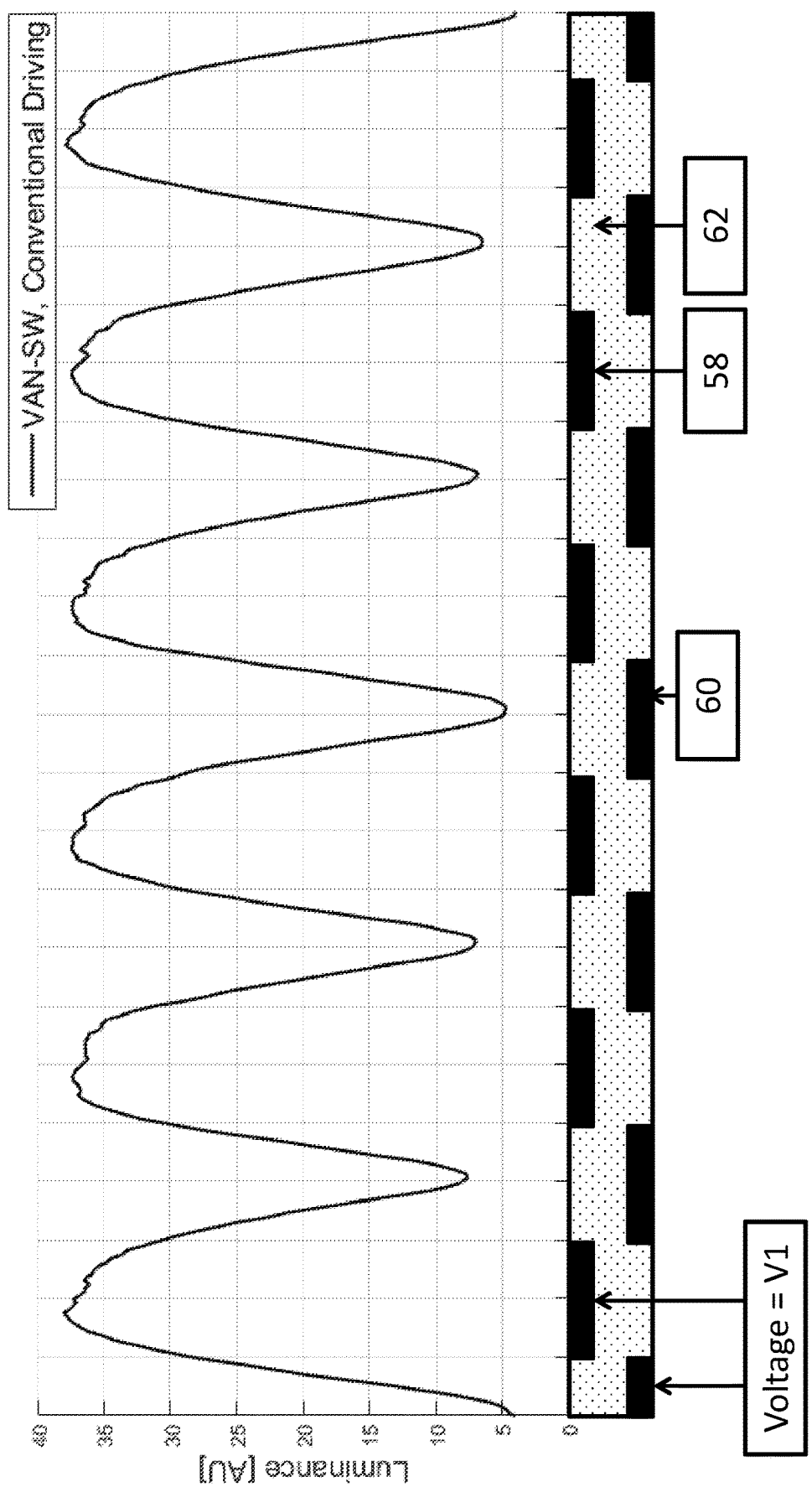
FIG. 10 is a graph depicting luminance variation with respect to electrode elements of a dual layer segmented electrode component, when driven by a single input voltage.

As illustrative of such issue, FIG. 10 is a graph depicting luminance variation with respect to electrode elements of a dual layer segmented electrode component, when driven by a single input driving voltage. FIG. 10 illustrates the luminance variation in connection with the exemplary optical stack arrangement of FIG. 4 having a single dual layer segmented electrode component, although comparable principles are applicable to the exemplary optical stack arrangement of FIG. 5 having two dual layer segmented electrode components. The graph of FIG. 10 shows that a spatial variation in luminance occurs when a given input voltage V1 is applied to multiple electrode elements, either for the 2D mode of the display device or in the transmissive areas of the LC parallax barrier in the 3D mode. The luminance variation occurs due to a variation in the electric field in the LC layer as a result of the separation of the segmented electrodes layers, with one such layer being farther from the LC layer. As identified with respect to FIG. 4, the electrode layers 58 and 60 are embedded within the insulator 62, which separates the electrode elements in the second electrode layer 60 from the LC layer. In contrast, the electrode elements of the first electrode layer 58 are not separated by the insulator layer 62 from the LC layer. Accordingly, when an input voltage is applied to one of the electrode elements in the electrode layer farther from the LC layer, a component of the input voltage is dropped over the insulator layer, which leads to a lower resultant voltage at the level of the electrode layer closer to the LC layer.

When a common voltage (V1) is applied to both electrode layers, there is thus a spatial variation in the voltage at the plane of the electrode layer closer to the LC layer. Specifically, at such plane the voltage will be higher above an electrode element in the first electrode layer 58 (closer to the LC layer) as compared to the voltage above an electrode element in the second electrode layer 60 (farther from the LC layer). Consequently, the liquid crystal re-orientation will be greater above an electrode element in the first electrode layer 58 (closer to the LC layer) as compared to the liquid crystal re-orientation above an electrode element in the second electrode layer 60 (farther from the LC layer), which results in the luminance variation depicted in FIG. 10. A spatial variation in luminance can be present even at high electric field, in which case the variation in re-orientation is caused by fringing electric fields caused by the spatial variation in the voltage adjacent to the LC layer.

Figure 11:
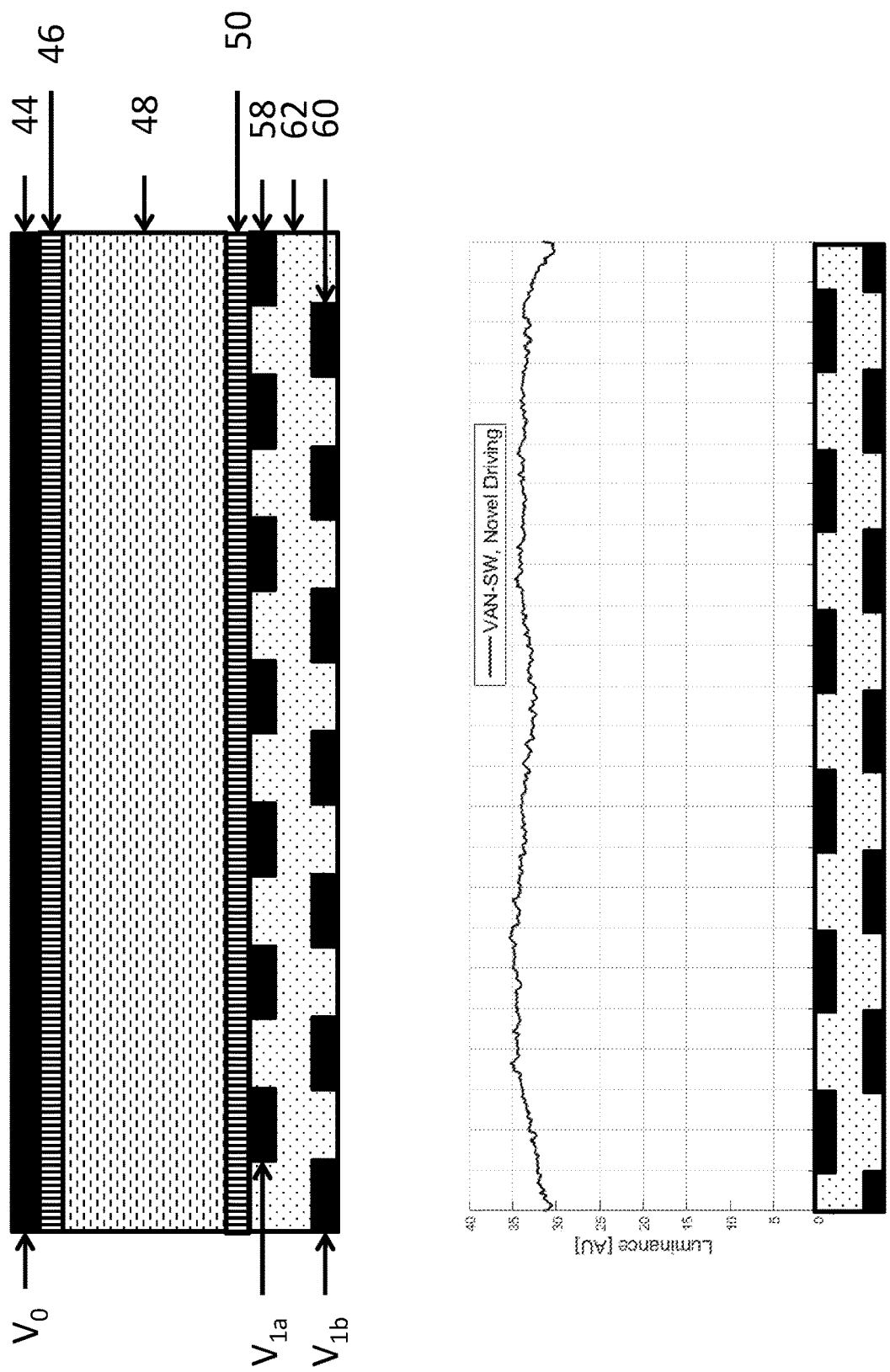
FIG. 11 is a schematic diagram and related graph depicting luminance enhancement by applying driving voltages in accordance with embodiments of the present invention, for an LC parallax barrier having a single dual layer segmented electrode component.

To address such issue, in exemplary embodiments, voltages of different magnitudes are applied to different layers of electrode elements within the dual layer segmented electrode component(s), and a voltage magnitude applied to elements of an electrode layer farther from the LC layer is greater than a voltage magnitude applied to elements of an electrode layer closer to the LC layer. FIG. 11 is a schematic diagram and related graph depicting luminance enhancement by applying driving voltages in accordance with embodiments of the present invention, for an LC parallax barrier having a single dual layer segmented electrode. The driving method of FIG. 11 overcomes the deficiency of luminance variation that is depicted in FIG. 10. The luminance variation is overcome by applying a first voltage magnitude to the first electrode layer 58 (V1a) closer to the LC layer and a second voltage magnitude to the second electrode layer 60 (V1b) farther from the LC layer, wherein the second voltage magnitude V1b is greater than the first voltage magnitude V1a. A suitable voltage V0, which may be ground, is applied to the common electrode layer 44 to permit a suitable electric potential difference to re-orient the LC crystals.

The difference between the voltage magnitudes of V1a and V1b depends on the separation distance of the two segmented electrode layers, the dielectric constant of the insulator material, the thickness of the LC layer, and the dielectric constants of the LC layer. In a suitable example that results in the luminance graph of FIG. 11, V1a=5V and V1b=5.5V, and typical ranges may be approximately as follows. The values which have the largest effect on the normalized voltage difference ($\Delta V=[V1a-V1b]/V1a$) are; the height of the liquid crystal layer ($H_{lc}$), the height of the insulator layer ($H_i$), the parallel dielectric permittivity of the liquid crystal ($\varepsilon_{\parallel}$), the dielectric anisotropy of the liquid crystal ($\Delta\varepsilon$) and the dielectric permittivity of the insulator ($\varepsilon_i$). The values may be within the following ranges: 2 µm<$H_{lc}$<7 µm, 0.1 µm<Hi<1 µm, 2<$\varepsilon_{\parallel}$<5, 1<$\Delta\varepsilon$<10, 2<$\varepsilon_i$<11. This would lead to a normalized voltage difference of between 0.003 and 3.25. Preferably, the values may be within the following ranges: 3 µm<$H_{lc}$<5 µm, 0.2 µm<Hi<0.6 µm, 2<$\varepsilon_{\parallel}$<5, 2<$\Delta\varepsilon$<8, 4<$\varepsilon_i$<8. This would lead to a normalized voltage difference of between 0.01 and 0.6. As shown in the graph portion of FIG. 11, the luminance variation has essentially been eliminated (the minor variations being negligible), with a high luminance value being maintained across the transmissive regions of the LC parallax barrier.

FIG. 12 is a schematic diagram and related graph depicting luminance enhancement by applying driving voltages in accordance with embodiments of the present invention, for an LC parallax barrier having two dual layer segmented electrodes. The driving method of FIG. 12 also overcomes the deficiency of luminance variation that is depicted in FIG. 10. Similarly as with respect to the embodiment of FIG. 11, different driving voltages V1a and V1b are applied to dual electrode layers of the non-viewing side segmented electrode component, as described above. Comparable different voltages are applied respectively to each of the dual electrode layers of the viewing side segmented electrode component.

In particular, with respect to the viewing side segmented electrode component, the luminance variation additionally is overcome by applying a third voltage magnitude to the first electrode layer 66 (V0a) closer to the LC layer and a fourth voltage magnitude to the second electrode layer 68 (V0b) farther from the LC layer, wherein the fourth voltage magnitude V0b is greater than the third voltage magnitude V0a. The difference between the voltage magnitudes of V0a and V0b also depends on the separation distance of the two segmented electrode layers, the dielectric constant of the insulator material, the thickness of the LC layer, and the dielectric constants of the LC layer. The third and fourth voltages typically would have a magnitude range comparable to the first and second voltages, although V1a may be equal to or not equal to V0a, and V1b may be equal to or not equal to V0b. As shown in the graph portion of FIG. 12, the luminance variation again has essentially been eliminated (the minor variations being negligible), with a high luminance value being maintained across the transmissive regions of the LC parallax barrier.

Figure 13:
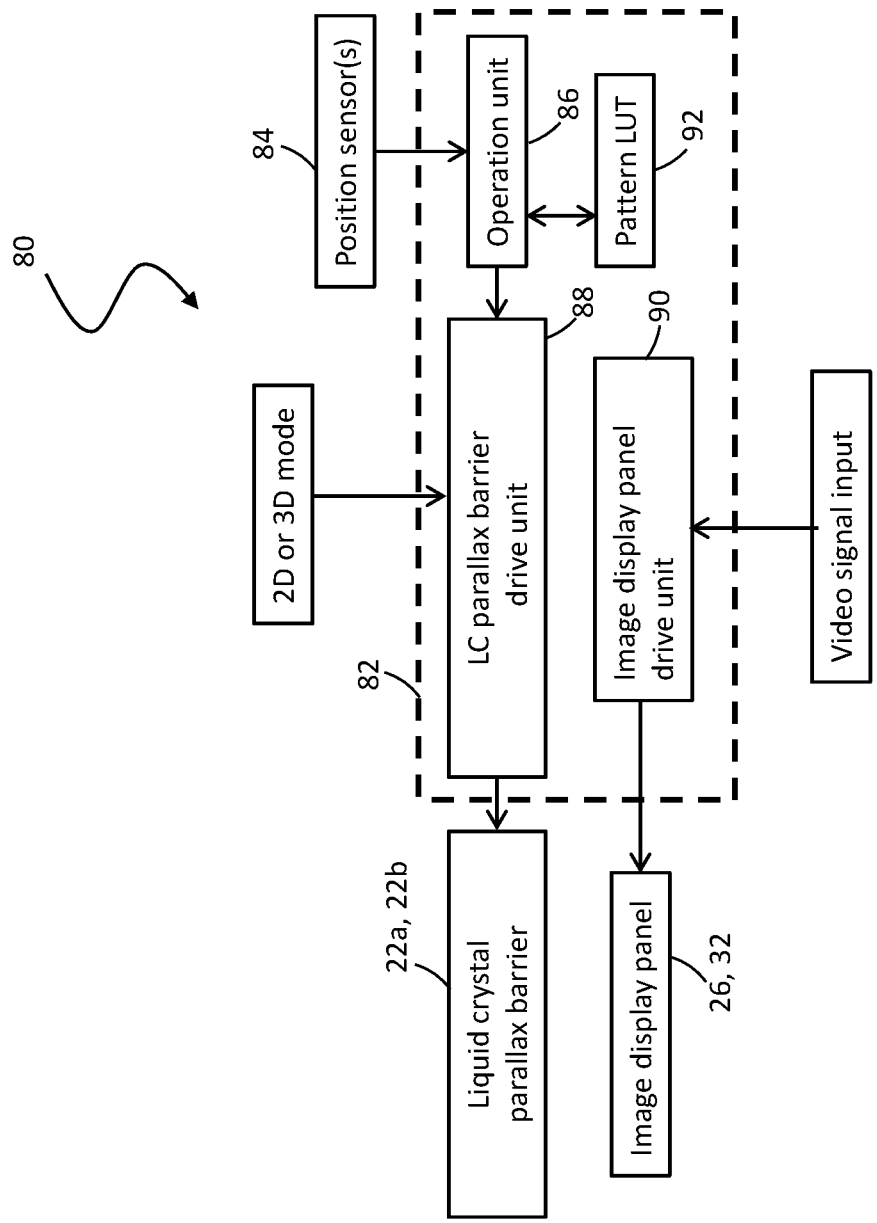
FIG. 13 is a block diagram illustrating an exemplary display system in accordance with embodiments of the present invention.

FIG. 13 is a block diagram illustrating an exemplary display system 80 in accordance with embodiments of the present invention. The display system 80 includes a control circuit 82 including processing devices that are configured to control operation of the display system 80, and a position sensor(s) 84 that performs head tracking for determining a viewer position relative to the display system 80. The control circuit 82 includes an operation unit 86 for communicating position information and barrier/slit patterning information to an LC parallax barrier drive unit 88, which drives the LC parallax barrier 22a or 22b in accordance with a corresponding barrier/slit pattern. The control circuit 82 further includes an image display panel drive unit 90 that drives the image display panel in accordance with a video signal input to produce an image on the image display panel. As referenced above, the image display panel may be either a transmissive type image display panel 26, or an emissive type image display panel 32.

The control circuit 82 further includes a barrier/slit pattern look-up table (LUT) 92, which sets forth the barrier and slit positions for a given head position as tracked by the position sensors 84. The barrier/slit pattern LUT may store the barrier/slit patterns for a range of head positions in a suitable 3D viewing zone. In exemplary embodiments, a barrier/slit pattern LUT may store, for each parallax barrier/slit position number, the electrode states for each independently addressable electrode within the segmented electrode layer or layers of the LC parallax barriers 22a or 22b as required to obtain the parallax barrier/slit position in each region. Based on such determination, the LC parallax barrier drive unit 88 drives the LC parallax barrier 22a/22b in accordance with a corresponding barrier/slit pattern based on the tracked head position.

In operation, a 2D or 3D mode is selected by any suitable viewer input to the display system. For a 2D mode, the LC parallax barrier drive unit 88 drives the LC parallax barrier 22a/22b to fully transmissive, thereby providing a high-quality 2D mode.

For the 3D mode selection, the position sensor(s) 84 tracks viewer head position and generates positional information of the viewer based on the head tracking. The position sensor(s) 84, for example, may include a camera and/or an infrared sensor. Alternatively, the position sensor 84 may include, for example, a pair of cameras and/or a pair of infrared sensors. An advantage of using a pair of cameras and/or a pair of infrared sensors separated in the lateral direction (x direction) is that the disparity between the information provided by a pair of sensors enables both lateral (x) and longitudinal (z) head position information to be obtained. An advantage of a large lateral separation between a pair of sensors is that the information gathered from the sensors may enable a more accurate calculation of the longitudinal position. An advantage of a smaller lateral separation between a pair of sensors is that the sensors may have a smaller field of view. A separation between a pair of sensors in the range from 4 cm to 25 cm is found to be suitable for a single viewer autostereoscopic display device.

The position sensor(s) 84 supply the generated position information to the operation unit 86, which combines the generated position information with information obtained from the barrier/slit pattern LUT 92 to output an appropriate barrier/slit pattern for implementation by the LC parallax barrier drive unit 88. The operation unit 86 analyses the generated position information of the viewer supplied from the position sensor(s) 84, and position coordinates of the viewer (x, y, z) may be calculated. Calculation of the position coordinates, for example, may be carried out by an eye-tracking system, face tracking system, or head tracking system for detecting the eye position of the viewer by an image processing method. Calculation of the position coordinates, for example, may be performed by a head tracking system for detecting a position of the head of the viewer by infrared sensing.

After determining the position information of the viewer, the operation unit 86 determines the required barrier/slit pattern for the LC parallax barrier panel 22a/22b. In other words, the position coordinates of the viewer are used to determine the slit versus barrier positions for the LC parallax barrier 22a/22b. The barrier/slit pattern may be calculated directly from the position coordinates of the viewer (x, y, z) using a predetermined mathematical formula or algorithm.

Alternatively, suitable barrier/slit patterns for the effective 3D viewing zone corresponding to respective position information may be stored in a memory device, such as for example in the barrier/slit pattern LUT 92, and the operation unit retrieves the barrier/slit pattern from the barrier/slit pattern LUT that corresponds to the generated position information. Based on the determined barrier/slit pattern, the state (opaque or transmissive) of each independently addressable electrode element may be stored in the barrier/slit LUT 92. When a barrier/slit pattern LUT 92 is used, the operation unit 86 retrieves the designated barrier/slit pattern that correspond the generated position information for a given set of position coordinates of the viewer (x, y, z) from the barrier/slit pattern LUT 92. When a barrier/slit pattern LUT 92 is used, the operation unit 86 also retrieves the designated electrode states for each independently addressable electrode element. If a time multiplexing method is used the ratios of the slit position may also be stored in the LUT.

The operation unit then controls the LC device to form that barrier/slits pattern that is retrieved from the LUT to generate the appropriate parallax barrier effect for the viewer position. Based on the determined barrier/slit pattern, the operation unit 86 may supply the LC parallax barrier drive unit 88 with the barrier/slit pattern associated with the position coordinates of the viewer 90 (x, y, z). The relationship between a given barrier/slit pattern and the voltage that is to be addressed to each of the individually addressable electrode elements pertaining to the LC parallax barrier 22a/22b may also be stored in the barrier/slit pattern LUT. The operation unit 86 may supply the switchable LC parallax barrier drive unit 88 with information regarding the voltage that is to be addressed to each of the individually addressable electrode elements pertaining to the LC parallax barrier 22a/22b. In general, the LC parallax barrier drive unit 88, based on information supplied from the operation unit, drives the switchable and re-configurable LC parallax barrier 22a/22b to enable viewing of high quality 3D images for the desired range of head positions.

To implement the features of the present invention, the components of the control system may be configured as processing devices, such as a CPU, microcontroller or microprocessor, that execute program code embodied as a control application stored within a storage device or memory of said control system components. It will be apparent to a person having ordinary skill in the art of computer programming, and specifically in application programming for electronic control devices, how to program control system to operate and carry out logical functions associated with any stored control application. Accordingly, details as to specific programming code have been left out for the sake of brevity. The memory devices of the control system, including for example the barrier/slit pattern LUT, may be configured as a non-transitory computer readable medium, such as random access memory (RAM), a read-only memory (ROM), an erasable programmable read-only memory (EPROM or Flash memory), or any other suitable computer-readable medium. Also, while the program code may be executed by processing devices in accordance with an exemplary embodiment, such control system functionality could also be carried out via dedicated hardware, firmware, software, or combinations thereof, without departing from the scope of the invention. In addition, although the components and memory devices of the control system are depicted as integral components in FIG. 13, such components may be integral or separate components as may be suitable for any particular application.

An aspect of the invention, therefore, is a liquid crystal (LC) device that has a layer configuration that optimizes a 3D viewing mode while also permitting a high quality 2D mode. In exemplary embodiments, a liquid crystal (LC) device comprising an optical stack arrangement including from the viewing side: a first electrode component; a first LC alignment layer; an LC layer; a second LC alignment layer; and a second electrode component. A voltage is applied to the LC device to create a potential difference between the first and second electrode components to switch an alignment of liquid crystals of selected portions of the LC layer from a first state when no voltage is applied to a second state when the voltage is applied. The first and second LC alignment layers are vertical alignment layers that induce a vertical alignment of the liquid crystals such that the first state when no voltage is applied is a vertical alignment state, and the liquid LC crystals switch to a planar alignment state as the second state when the voltage is applied. At least one of the first and second electrode components is a dual layer segmented electrode component comprising a first layer of electrode elements separated by inter-electrode gaps and a second layer of electrode elements separated by inter-electrode gaps, the first layer of electrode elements and the second layer of electrode elements being spaced apart in a viewing direction by an insulator layer. The LC device may include one or more of the following features, either individually or in combination.

In an exemplary embodiment of the LC device, portions of the LC layer in the first state are opaque barrier regions that block light through the LC layer, and portions of the LC layer in the second state are transmissive slit regions that transmit light through the LC layer.

In an exemplary embodiment of the LC device, the electrode elements of the at least one segmented electrode component are selectively addressable to switch selected portions of the LC layer from the first state to the second state.

In an exemplary embodiment of the LC device, the electrode elements and the inter-electrode gaps are identical sizes.

In an exemplary embodiment of the LC device, the electrode elements of the second electrode layer are farther from the LC layer than the electrode elements of the first electrode layer, and the electrode elements of the second electrode layer are larger than the electrode elements of the first electrode layer.

In an exemplary embodiment of the LC device, the first electrode component is a common electrode component comprising a continuous electrode layer, and the second electrode component is the segmented electrode component.

In an exemplary embodiment of the LC device, both the first and second electrode components are dual layer segmented electrode components, wherein each segmented electrode component comprises a first layer of electrode elements separated by inter-electrode gaps and a second layer of electrode elements separated by inter-electrode gaps, the first layer of electrode elements and the second layer of electrode elements being spaced apart in the viewing direction by an insulator layer.

In an exemplary embodiment of the LC device, a pitch of the electrode elements of the first electrode component differs from a pitch of the electrode elements of the second electrode component.

In an exemplary embodiment of the LC device, the LC device further includes a front polarizer on a viewing side of the first electrode component and a rear polarizer on a non-viewing side of the second electrode component.

Another aspect of the invention is a display system that includes an image panel that emits light in the viewing direction corresponding to an image, and the LC device of any of the embodiments. In exemplary embodiments, the display system includes a position sensor that tracks a head position of a viewer to generate position information; and a control system that is configured to receive the generated position information from the position sensor and based on the generated position information, controls the LC device to select portions of LC device to switch from the first state to the second state to form a barrier/slit pattern to generate a parallax barrier effect. The control system may include a look-up table that sets forth corresponding barrier/slit patterns and position information, and the control system controls the LC device to form a barrier/slit pattern retrieved from the look-up table that corresponds to the generated position information from the sensor.

Another aspect of the invention is a control method of controlling a liquid crystal (LC) device to generate a parallax barrier effect to generate the enhanced 3D mode while also permitting a high-quality 2D mode. In exemplary embodiments, the control method includes the steps of: providing an LC device according to any of the embodiments, and applying a voltage to a selected portion of the electrode elements of the at least one segmented electrode component to switch an alignment of liquid crystals of a portion of the LC layer corresponding to the selected portion of the electrode elements from the first state to the second state to form a pattern of opaque barrier regions that block light through the LC layer, and transmissive slit regions that transmit light through the LC layer, thereby generating the parallax barrier effect. The control method may include one or more of the following features, either individually or in combination.

In an exemplary embodiment of the control method, a portion of the LC layer that remains in the first state comprises the opaque barrier regions and the portion of the LC layer that is switched to the second state comprises the transmissive slit regions.

In an exemplary embodiment of the control method, the first layer of electrode elements is closer to the LC layer than the second layer of electrode elements in the viewing direction, the control method further comprising: applying a first voltage having a first magnitude to the first electrode layer; and applying a second voltage having a second magnitude to the second electrode layer, wherein the second magnitude is greater than the first magnitude.

In an exemplary embodiment of the control method, the second electrode component is the segmented electrode component located on a non-viewing side of the LC layer; the first electrode component is another dual layer segmented electrode component located on a viewing side of the LC layer, the another segmented electrode component comprising a viewing side first layer of electrode elements separated by inter-electrode gaps and a viewing side second layer of electrode elements separated by inter-electrode gaps, the viewing side first layer of electrode elements and the viewing side second layer of electrode elements being spaced apart in the viewing direction by another insulator layer; and the viewing side first layer of electrode elements is closer to the LC layer than the viewing side second layer of electrode elements in the viewing direction. The control method further includes: applying a third voltage having a third magnitude to the viewing side first electrode layer; and applying a fourth voltage having a fourth magnitude to the viewing side second electrode layer, wherein the fourth magnitude is greater than the third magnitude.

In an exemplary embodiment of the control method, the first magnitude is equal to the third magnitude, and the second magnitude is equal to the fourth magnitude.

In an exemplary embodiment of the control method, the first electrode component is a common electrode component comprising a continuous electrode layer, and the second electrode component is the segmented electrode component, the method further comprising applying a constant voltage to the common electrode component.

In an exemplary embodiment of the control method, the control method further includes tracking a head position of a viewer with a position sensor to generate position information; and based on the generated position information, controlling the LC device to select portions of LC device to switch from the first state to the second state to form a barrier/slit pattern to generate the parallax barrier effect.

In an exemplary embodiment of the control method, the control method further includes storing in a look-up table corresponding barrier/slit patterns and position information; retrieving a barrier/slit pattern from the look-up table that corresponds to the generated position information from the sensor; and controlling the LC device to form the barrier/slit pattern that is retrieved from the look-up table to generate the parallax barrier effect.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

INDUSTRIAL APPLICABILITY

Embodiments of the present invention are applicable to many display devices in which a directional mode, such as a 3D mode, is desirable in combination with maintaining an enhanced 2D mode. Examples of such devices include autostereoscopic 3D display systems and privacy mode display systems.

REFERENCE SIGNS LIST

10—parallax barrier type 3D display system
12—parallax barrier
14—display unit
16—transmissive slit regions
18—opaque barrier regions
20a—display system
20b—display system
22—LC device
22a—LC parallax barrier
22b—LC parallax barrier
24—first gap layer
26—transmissive type image panel
28—second gap layer
30—backlight unit
32—emissive type image panel
40—front polarizer
42—front substrate
44—common electrode layer
46—front LC alignment layer
48—LC layer
50—rear LC alignment layer
52—segmented electrode component
54—rear substrate
56—rear polarizer
58—first layer of electrode elements
59—inter-electrode gaps
60—second layer of electrode elements
62—insulating layer
64—second (viewing side) segmented electrode component
66—first layer of electrode elements
67—inter-electrode gaps
68—second layer of electrode elements
70—insulating layer
72—liquid crystals
74—transmissive slit region
76—opaque barrier region
78—opaque barrier region
80—exemplary display system
82—control circuit
84—position sensor(s)
86—operation unit
88—LC parallax barrier drive unit
90—image display panel drive unit
92—barrier/slit pattern look-up table (LUT)

What is claimed is:

1. A liquid crystal (LC) device comprising an optical stack arrangement including from a viewing side:
a first electrode component;
a first LC alignment layer;
an LC layer;
a second LC alignment layer; and
a second electrode component,
wherein:
a voltage is applied to the LC device to create a potential difference between the first and second electrode components to switch an alignment of liquid crystals of selected portions of the LC layer from a first state when no voltage is applied to a second state when the voltage is applied;
the first and second LC alignment layers are vertical alignment layers that induce a vertical alignment of the liquid crystals such that the first state when no voltage is applied is a vertical alignment state, and the liquid crystals switch to a planar alignment state as the second state when the voltage is applied; and
at least one of the first and second electrode components is a dual layer segmented electrode component comprising a first layer of electrode elements separated by inter-electrode gaps and a second layer of electrode elements separated by inter-electrode gaps, the first layer of electrode elements and the second layer of electrode elements being spaced apart in a viewing direction by an insulator layer;
wherein portions of the LC layer in the first state are opaque barrier regions that block light through the LC layer, and portions of the LC layer in the second state are transmissive slit regions that transmit light through the LC layer.

2. The LC device of claim 1, wherein the electrode elements of the at least one segmented electrode component are selectively addressable to switch selected portions of the LC layer from the first state to the second state.

3. The LC device of claim 1, wherein the electrode elements and the inter-electrode gaps are identical sizes.

4. The LC devices of claim 1, wherein the electrode elements of the second electrode component are farther from the LC layer than the electrode elements of the first electrode component, and the electrode elements of the second electrode component are larger than the electrode elements of the first electrode component.

5. The LC device of claim 1, wherein the first electrode component is a common electrode component comprising a continuous electrode layer, and the second electrode component is the segmented electrode component.

6. The LC device of claim 1, wherein both the first and second electrode components are dual layer segmented electrode components, wherein each segmented electrode component comprises a first layer of electrode elements separated by inter-electrode gaps and a second layer of electrode elements separated by inter-electrode gaps, the first layer of electrode elements and the second layer of electrode elements being spaced apart in the viewing direction by an insulator layer.

7. The LC device of claim 6, wherein a pitch of the electrode elements of the first electrode component differs from a pitch of the electrode elements of the second electrode component.

8. The LC device of claim 1, further comprising a front polarizer on a viewing side of the first electrode component and a rear polarizer on a non-viewing side of the second electrode component.

9. A display system comprising:
an image panel that emits light in the viewing direction corresponding to an image; and
the LC device of claim 1.

10. The display system of claim 9, further comprising:
a position sensor that tracks a head position of a viewer to generate position information; and
a control system that is configured to receive the generated position information from the position sensor and based on the generated position information, controls the LC device to select portions of the LC device to switch from the first state to the second state to form a barrier/slit pattern to generate a parallax barrier effect.

11. The display system of claim 10, wherein the control system includes a look-up table that sets forth corresponding barrier/slit patterns and position information, and the control system controls the LC device to form a barrier/slit pattern retrieved from the look-up table that corresponds to the generated position information from the sensor.

12. The LC device of claim 1, wherein:
the first electrode component is the dual layer segmented electrode component having the first layer of electrode elements and the second layer of electrode elements
the first layer of electrode elements is closer to the LC layer than the second layer of electrode elements in the viewing direction; and
the first layer of electrode elements is connected to a first voltage having a first magnitude to create a first potential difference between the first layer of electrode elements and the second electrode component, and the second layer of electrode elements is connected to a second voltage having a second magnitude to create a second potential difference between the second layer of electrode elements and the second electrode component;
wherein the second magnitude is greater than the first magnitude, and both the first and second potential differences are sufficient to switch the alignment of liquid crystals of the selected portions of the LC layer from the first state when no voltage is applied to the second state.

13. A control method of controlling a liquid crystal (LC) device to generate a parallax barrier effect comprising the steps of:
providing an LC device comprising an optical stack arrangement including from a viewing side: a first electrode component; a first LC alignment layer; an LC layer; a second LC alignment layer; and a second electrode component,
wherein:
the first and second LC alignment layers are vertical alignment layers that induce a vertical alignment of liquid crystals of the LC layer such that a first state when no voltage is applied is a vertical alignment state, and the liquid crystals switch to a planar alignment state as a second state when a voltage is applied to the LC device; and
at least one of the first and second electrode components is a dual layer segmented electrode component comprising a first layer of electrode elements separated by inter-electrode gaps and a second layer of electrode elements separated by inter-electrode gaps, the first layer of electrode elements and the second layer of electrode elements being spaced apart in a viewing direction by an insulator layer; and
the method further comprising applying a voltage to a selected portion of the electrode elements of the at least one segmented electrode component to switch an alignment of liquid crystals of a portion of the LC layer corresponding to the selected portion of the electrode elements from the first state to the second state to form a pattern of opaque barrier regions that block light through the LC layer, and transmissive slit regions that transmit light through the LC layer, thereby generating the parallax barrier effect; and
wherein a portion of the LC layer that remains in the first state comprises the opaque barrier regions and the portion of the LC layer that is switched to the second state comprises the transmissive slit regions.

14. The control method of claim 13, wherein the first electrode component is the dual layer segmented electrode component having the first layer of electrode elements and the second layer of electrode elements, and the first layer of electrode elements is closer to the LC layer than the second layer of electrode elements in the viewing direction, the control method further comprising:
applying a first voltage having a first magnitude to the first layer of electrode elements to create a first potential difference between the first layer of electrode elements and the second electrode component; and
applying a second voltage having a second magnitude to the second layer of electrode elements to create a second potential difference between the second layer of electrode elements and the second electrode component;
wherein the second magnitude is greater than the first magnitude, and both the first and second potential differences are sufficient to switch the alignment of liquid crystals of the selected portion of the LC layer from the first state when no voltage is applied to the second state.

15. The control method of claim 14, wherein:
the second electrode component is the segmented electrode component located on a non-viewing side of the LC layer;

the first electrode component is another dual layer segmented electrode component located on a viewing side of the LC layer, the another segmented electrode component comprising a viewing side first layer of electrode elements separated by inter-electrode gaps and a viewing side second layer of electrode elements separated by inter-electrode gaps, the viewing side first layer of electrode elements and the viewing side second layer of electrode elements being spaced apart in the viewing direction by another insulator layer; and the viewing side first layer of electrode elements is closer to the LC layer than the viewing side second layer of electrode elements in the viewing direction;

the control method further comprising:

applying a third voltage having a third magnitude to the viewing side first layer of electrode elements; and applying a fourth voltage having a fourth magnitude to the viewing side second layer of electrode elements, wherein the fourth magnitude is greater than the third magnitude.

16. The control method of claim 15, wherein the first magnitude is equal to the third magnitude, and the second magnitude is equal to the fourth magnitude.

17. The control method of claim 13, wherein the first electrode component is a common electrode component comprising a continuous electrode layer, and the second electrode component is the segmented electrode component, the method further comprising applying a constant voltage to the common electrode component.

18. The control method of claim 13, further comprising:

tracking a head position of a viewer with a position sensor to generate position information; and based on the generated position information, controlling the LC device to select portions of the LC device to switch from the first state to the second state to form a barrier/slit pattern to generate the parallax barrier effect.

19. The control method of claim 18, further comprising:

storing in a look-up table corresponding barrier/slit patterns and position information;

retrieving a barrier/slit pattern from the look-up table that corresponds to the generated position information from the sensor; and controlling the LC device to form the barrier/slit pattern that is retrieved from the look-up table to generate the parallax barrier effect.

* * * * *